(12) United States Patent
Boo

(10) Patent No.: US 11,076,691 B2
(45) Date of Patent: Aug. 3, 2021

(54) SET OF PANELS WITH A MECHANICAL LOCKING DEVICE

(71) Applicant: Välinge Innovation AB, Viken (SE)

(72) Inventor: Christian Boo, Kagerod (SE)

(73) Assignee: VALINGE INNOVATION AB, Viken (SE)

( * ) Notice: Subject to any disclaimer, the term of this patent is extended or adjusted under 35 U.S.C. 154(b) by 26 days.

(21) Appl. No.: 16/386,824

(22) Filed: Apr. 17, 2019

(65) Prior Publication Data
US 2019/0320793 A1 Oct. 24, 2019

(30) Foreign Application Priority Data

Apr. 18, 2018 (SE) .................................... 1850447-2

(51) Int. Cl.
| | | |
|---|---|---|
| *A47B 43/00* | (2006.01) | |
| *A47B 47/00* | (2006.01) | |
| *A47B 47/04* | (2006.01) | |
| *F16B 12/12* | (2006.01) | |

(52) U.S. Cl.
CPC ...... *A47B 47/0066* (2013.01); *A47B 47/0075* (2013.01); *A47B 47/042* (2013.01); *F16B 12/125* (2013.01); *E04F 2201/0138* (2013.01)

(58) Field of Classification Search
CPC .............. A47B 47/042; A47B 47/0066; A47B 47/0075; F16B 12/125; E04F 2201/0138
See application file for complete search history.

(56) References Cited

U.S. PATENT DOCUMENTS

| 291,032 A | 1/1884 | Cleland |
|---|---|---|
| 634,581 A | 10/1899 | Miller |
| 701,000 A | 5/1902 | Ahrens |

(Continued)

FOREIGN PATENT DOCUMENTS

| CH | 365 507 A | 11/1962 |
|---|---|---|
| CH | 685 276 A5 | 5/1995 |

(Continued)

OTHER PUBLICATIONS

U.S. Appl. No. 16/553,325, Peter Derelöv and Johan Svensson, filed Aug. 28, 2019.

(Continued)

*Primary Examiner* — Matthew W Ing
(74) *Attorney, Agent, or Firm* — Buchanan Ingersoll & Rooney P.C.

(57) ABSTRACT

A method for dismantling a set and a set including a first panel, a second panel and a mechanical locking device for locking the first panel to the second panel, wherein the first panel includes a first edge surface and a first panel surface, the second panel includes a second panel surface, the mechanical locking device includes an panel groove at the second panel surface, a flexible tongue positioned in the panel groove, a rod-shaped element at the first edge surface and an insertion groove at the second panel surface extending from the second panel surface to the panel groove, the rod-shaped element is configured to be inserted into the insertion groove and the rod-shaped element includes a recess, the flexible tongue is configured to cooperate with the recess, and the panel groove extending at an angle α in the second panel.

24 Claims, 9 Drawing Sheets

(56) References Cited

U.S. PATENT DOCUMENTS

| | | | |
|---|---|---|---|
| 861,911 | A | 7/1907 | Stewart |
| 881,673 | A | 3/1908 | Ellison |
| 1,533,099 | A | 4/1925 | Carroll |
| 1,534,468 | A | 4/1925 | Shea, Jr. |
| 1,800,386 | A | 4/1931 | Hoffman |
| 1,800,387 | A | 4/1931 | Greist |
| 1,802,245 | A | 4/1931 | Foretich |
| 1,954,242 | A | 4/1934 | Heppenstall |
| 2,360,451 | A | 10/1944 | Stone |
| 2,362,904 | A | 11/1944 | Kramer |
| 2,496,184 | A | 1/1950 | Von Canon |
| 2,681,483 | A | 6/1954 | Morawetz |
| 3,002,630 | A | 10/1961 | Heisser |
| 3,195,968 | A | 7/1965 | Freeman |
| 3,284,152 | A | 11/1966 | Schörghuber |
| 3,313,054 | A | 4/1967 | Madey |
| 3,347,610 | A | 10/1967 | Pilliod |
| 3,410,441 | A | 11/1968 | Rhyne |
| 3,722,704 | A | 3/1973 | Piretti |
| 3,722,971 | A | 3/1973 | Zeischegg |
| 3,742,807 | A | 7/1973 | Manning |
| 3,765,465 | A | 10/1973 | Gulistan |
| 3,784,271 | A | 1/1974 | Schreiber |
| 3,884,002 | A | 5/1975 | Logie |
| 3,885,845 | A | 5/1975 | Krieks |
| 3,981,118 | A | 9/1976 | Johnson et al. |
| 4,089,614 | A | 5/1978 | Harley |
| 4,099,887 | A | 7/1978 | Mackenroth |
| 4,116,510 | A | 9/1978 | Franco |
| 4,142,271 | A | 3/1979 | Busse |
| 4,211,379 | A | 7/1980 | Morgan et al. |
| 4,222,544 | A | 9/1980 | Crowder |
| 4,279,397 | A | 7/1981 | Larsson |
| 4,299,067 | A | 11/1981 | Bertschi |
| 4,308,961 | A | 1/1982 | Kunce |
| 4,324,517 | A | 4/1982 | Dey |
| 4,403,886 | A | 9/1983 | Haeusler |
| 4,405,253 | A | 9/1983 | Stockum |
| 4,509,648 | A | 4/1985 | Govang |
| 4,593,734 | A | 6/1986 | Wallace |
| 4,595,105 | A | 6/1986 | Gold |
| 4,597,122 | A | 7/1986 | Handler |
| 4,615,448 | A | 10/1986 | Johnstonbaugh |
| 4,629,076 | A | 12/1986 | Amstutz et al. |
| 4,750,794 | A | 6/1988 | Vegh |
| 4,752,150 | A | 6/1988 | Salice |
| 4,815,908 | A | 3/1989 | Duran et al. |
| 4,817,900 | A | 4/1989 | Whittington et al. |
| 4,844,266 | A | 7/1989 | Small et al. |
| 4,869,564 | A * | 9/1989 | Lechman ............ A47B 13/003 312/195 |
| 4,883,331 | A | 11/1989 | Mengel |
| 4,886,326 | A | 12/1989 | Kuzyk |
| 4,888,933 | A | 12/1989 | Guomundsson |
| 4,891,897 | A | 1/1990 | Gieske et al. |
| 4,909,581 | A | 3/1990 | Haheeb |
| 4,938,625 | A | 7/1990 | Matsui |
| 4,944,416 | A | 7/1990 | Petersen et al. |
| 4,961,295 | A | 10/1990 | Kosch, Sr. et al. |
| 5,004,116 | A | 4/1991 | Cattarozzi |
| 5,018,323 | A | 5/1991 | Clausen |
| 5,109,993 | A | 5/1992 | Hutchison |
| 5,114,265 | A | 5/1992 | Grisley |
| 5,121,578 | A | 6/1992 | Holz |
| 5,125,518 | A | 6/1992 | Ward |
| 5,138,803 | A | 8/1992 | Grossen |
| 5,209,556 | A | 5/1993 | Anderson |
| 5,212,925 | A | 5/1993 | McClinton |
| 5,299,509 | A | 4/1994 | Ballard |
| 5,360,121 | A | 11/1994 | Sothman |
| 5,375,802 | A | 12/1994 | Branham, II |
| 5,423,155 | A | 6/1995 | Bauer |
| 5,451,102 | A | 9/1995 | Chuan |
| 5,458,433 | A | 10/1995 | Stastny |
| 5,471,804 | A | 12/1995 | Winter, IV |
| 5,475,960 | A | 12/1995 | Lindal |
| 5,499,667 | A | 3/1996 | Nakanishi |
| 5,499,886 | A | 3/1996 | Short et al. |
| 5,507,331 | A | 4/1996 | Nakanishi |
| 5,527,103 | A | 6/1996 | Pittman |
| 5,658,086 | A | 8/1997 | Brokaw et al. |
| 5,711,115 | A | 1/1998 | Wirt |
| 5,775,521 | A | 7/1998 | Tisbo |
| 5,810,505 | A | 9/1998 | Henriott |
| 5,893,617 | A | 4/1999 | Lee |
| 5,941,026 | A | 8/1999 | Eisenreich |
| 5,944,294 | A | 8/1999 | Baer |
| 5,950,389 | A | 9/1999 | Porter |
| 6,045,290 | A | 4/2000 | Nocievski |
| 6,050,426 | A | 4/2000 | Leurdijk |
| 6,142,436 | A | 11/2000 | Thurston et al. |
| 6,312,186 | B1 | 11/2001 | Röck et al. |
| 6,349,507 | B1 | 2/2002 | Muellerleile |
| 6,363,645 | B1 | 4/2002 | Hunter |
| 6,413,007 | B1 | 7/2002 | Lambright |
| 6,418,683 | B1 | 7/2002 | Martensson |
| 6,491,172 | B2 | 12/2002 | Chance |
| 6,505,452 | B1 | 1/2003 | Hannig |
| 6,547,086 | B1 | 4/2003 | Harvey |
| 6,578,498 | B1 | 6/2003 | Draudt et al. |
| 6,675,979 | B2 | 1/2004 | Taylor |
| D486,676 | S | 2/2004 | Campbell et al. |
| 6,769,219 | B2 | 8/2004 | Schwitte et al. |
| 6,772,890 | B2 | 8/2004 | Campbell et al. |
| 6,827,028 | B1 | 12/2004 | Callaway |
| 6,971,614 | B2 | 12/2005 | Fischer et al. |
| 7,127,860 | B2 | 10/2006 | Pervan |
| 7,223,045 | B2 | 5/2007 | Migli |
| 7,228,977 | B2 | 6/2007 | Perkins et al. |
| 7,300,120 | B2 | 11/2007 | Shin |
| 7,451,535 | B2 | 11/2008 | Wells et al. |
| 7,451,578 | B2 | 11/2008 | Hannig |
| 7,584,583 | B2 | 9/2009 | Bergelin et al. |
| 7,614,350 | B2 | 11/2009 | Tuttle et al. |
| 7,621,092 | B2 | 11/2009 | Groeke et al. |
| 7,641,414 | B1 | 1/2010 | Joyce |
| 7,717,278 | B2 | 5/2010 | Kao |
| 7,721,503 | B2 | 5/2010 | Pervan et al. |
| 7,793,450 | B2 | 9/2010 | Chasmer et al. |
| 7,818,939 | B2 | 10/2010 | Bearinger |
| 7,998,549 | B2 | 8/2011 | Susnjara |
| 8,033,074 | B2 | 10/2011 | Pervan |
| 8,038,363 | B2 | 10/2011 | Hannig |
| 8,042,311 | B2 | 10/2011 | Pervan |
| 8,146,754 | B2 | 4/2012 | Apgood |
| 8,220,217 | B2 | 7/2012 | Muehlebach |
| 8,234,830 | B2 | 8/2012 | Pervan |
| 8,365,499 | B2 | 2/2013 | Nilsson et al. |
| 8,387,327 | B2 | 3/2013 | Pervan |
| 8,464,408 | B2 | 6/2013 | Hazzard |
| 8,495,849 | B2 | 7/2013 | Pervan |
| 8,505,257 | B2 | 8/2013 | Boo et al. |
| 8,544,230 | B2 | 10/2013 | Pervan |
| 8,596,013 | B2 | 12/2013 | Boo |
| 8,602,227 | B1 | 12/2013 | McDonald |
| 8,615,952 | B2 | 12/2013 | Engström |
| 8,713,886 | B2 | 5/2014 | Pervan |
| 8,745,952 | B2 | 6/2014 | Perra |
| 8,764,137 | B2 | 7/2014 | Fehre |
| 8,776,473 | B2 | 7/2014 | Pervan |
| 8,833,028 | B2 | 9/2014 | Whispell et al. |
| 8,864,407 | B1 | 10/2014 | Sorum |
| 8,882,416 | B2 | 11/2014 | Baur et al. |
| 8,887,468 | B2 | 11/2014 | Håkansson et al. |
| 9,175,703 | B2 | 11/2015 | Maertens |
| 9,216,541 | B2 | 12/2015 | Boo |
| 9,290,948 | B2 | 3/2016 | Cappelle et al. |
| 9,375,085 | B2 | 6/2016 | Derelöv |
| 9,538,842 | B2 | 1/2017 | Håkansson et al. |
| 9,655,442 | B2 | 5/2017 | Boo et al. |
| 9,700,157 | B2 | 7/2017 | Keyvanloo |
| 9,714,672 | B2 | 7/2017 | Derelöv et al. |
| 9,723,923 | B2 | 8/2017 | Derelöv |
| 9,726,210 | B2 | 8/2017 | Derelöv et al. |

(56) References Cited

U.S. PATENT DOCUMENTS

| | | |
|---|---|---|
| 9,745,756 B2 | 8/2017 | Hannig |
| 9,758,973 B2 | 9/2017 | Segaert |
| 9,763,528 B2 | 9/2017 | Lung |
| 9,809,983 B2 | 11/2017 | Trudel |
| 9,945,121 B2 | 4/2018 | Derelöv |
| 10,034,541 B2 | 7/2018 | Boo et al. |
| 10,202,996 B2 | 2/2019 | Håkansson et al. |
| 10,378,570 B2 | 8/2019 | Broughton |
| 10,415,613 B2 | 9/2019 | Boo |
| 10,448,739 B2 | 10/2019 | Derelöv et al. |
| 10,451,097 B2 | 10/2019 | Brännström et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv |
| 10,670,064 B2 | 6/2020 | Derelöv |
| 10,724,564 B2 * | 7/2020 | Derelov ............... F16B 12/125 |
| 10,731,688 B2 | 8/2020 | Brännström et al. |
| 10,736,416 B2 | 8/2020 | Derelöv |
| 10,830,266 B2 | 11/2020 | Fridlund |
| 10,830,268 B2 | 11/2020 | Boo |
| 10,871,179 B2 | 12/2020 | Håkansson et al. |
| 10,876,562 B2 | 12/2020 | Pervan |
| 10,876,563 B2 | 12/2020 | Derelöv et al. |
| 10,968,936 B2 | 4/2021 | Boo et al. |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0236544 A1 | 10/2005 | Mancino |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engström |
| 2007/0028547 A1 | 2/2007 | Grafenauer et al. |
| 2008/0010937 A1 | 1/2008 | Pervan et al. |
| 2008/0066415 A1 | 3/2008 | Pervan |
| 2008/0193209 A1 | 8/2008 | Henderson |
| 2008/0216435 A1 | 9/2008 | Nolan |
| 2008/0236088 A1 | 10/2008 | Hannig et al. |
| 2008/0244882 A1 | 10/2008 | Woxman et al. |
| 2009/0014401 A1 | 1/2009 | Tallman |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Håkansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan |
| 2013/0097846 A1 | 4/2013 | Pettigrew |
| 2013/0111845 A1 | 5/2013 | Pervan |
| 2013/0170904 A1 | 7/2013 | Cappelle et al. |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Håkansson et al. |
| 2015/0078807 A1 * | 3/2015 | Brannstrom ............ F16B 12/26 403/19 |
| 2015/0078819 A1 | 3/2015 | Derelöv et al. |
| 2015/0196118 A1 | 7/2015 | Derelöv |
| 2015/0198191 A1 | 7/2015 | Boo |
| 2015/0230600 A1 | 8/2015 | Schulte |
| 2015/0368896 A1 | 12/2015 | Schulte |
| 2016/0000220 A1 | 1/2016 | Devos |
| 2016/0007751 A1 | 1/2016 | Derelöv |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Derelöv |
| 2017/0079433 A1 | 3/2017 | Derelöv et al. |
| 2017/0089379 A1 * | 3/2017 | Pervan ................ A47B 47/025 |
| 2017/0097033 A1 | 4/2017 | Håkansson et al. |
| 2017/0159291 A1 * | 6/2017 | Derelov ................ A47B 47/04 |
| 2017/0208938 A1 | 7/2017 | Derelöv et al. |
| 2017/0227031 A1 | 8/2017 | Boo |
| 2017/0227032 A1 * | 8/2017 | Fridlund ............... F16B 5/0044 |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0283430 A1 | 10/2018 | Leistert |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0121076 A1 | 4/2020 | Derelöv et al. |
| 2020/0214447 A1 | 7/2020 | Derelöv et al. |
| 2020/0300284 A1 | 9/2020 | Pervan |
| 2020/0337455 A1 | 10/2020 | Boo et al. |
| 2020/0340513 A1 | 10/2020 | Derelöv |
| 2021/0079650 A1 | 3/2021 | Derelöv |

FOREIGN PATENT DOCUMENTS

| | | |
|---|---|---|
| CH | 696 889 A5 | 1/2008 |
| CH | 698 988 B1 | 12/2009 |
| CH | 705 082 A2 | 12/2012 |
| CN | 101099618 A | 1/2008 |
| CN | 102 917 616 A | 2/2013 |
| CN | 20324576 U | 2/2014 |
| DE | 1107910 B | 5/1961 |
| DE | 24 14 104 A1 | 10/1975 |
| DE | 25 14 357 A1 | 10/1975 |
| DE | 31 03 281 A1 | 8/1982 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2005 019 986 U1 | 2/2006 |

(56) References Cited

FOREIGN PATENT DOCUMENTS

| | | |
|---|---|---|
| DE | 20 2004 017 486 U1 | 4/2006 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2013 008 595 A1 | 11/2013 |
| DE | 10 2015 103 429 A1 | 10/2015 |
| DE | 10 2014 110 124 A1 | 1/2016 |
| DE | 20 2017 101 856 U1 | 4/2017 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |
| EP | 1 048 423 B9 | 5/2005 |
| EP | 1 650 375 A1 | 4/2006 |
| EP | 1 650 375 A8 | 4/2006 |
| EP | 1 671 562 A1 | 6/2006 |
| EP | 1 922 954 A1 | 5/2008 |
| EP | 2 017 403 A2 | 1/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| EP | 3 031 998 A1 | 6/2016 |
| FR | 2 517 187 A1 | 6/1983 |
| FR | 2 597 173 A1 | 10/1987 |
| FR | 2 602 013 A1 | 1/1988 |
| GB | 245332 | 1/1926 |
| GB | 1 022 377 A | 3/1966 |
| GB | 2 163 825 A | 3/1986 |
| GB | 2 315 988 A | 2/1998 |
| GB | 2 445 954 A | 7/2008 |
| GB | 2 482 213 A | 1/2012 |
| GB | 2 520 927 A | 6/2015 |
| JP | S53-113160 U | 9/1978 |
| JP | H06-22606 U | 3/1994 |
| JP | 2003-239921 A | 8/2003 |
| KR | 10-1147274 B1 | 5/2012 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/53628 A1 | 7/2001 |
| WO | WO 02/055809 A1 | 7/2002 |
| WO | WO 02/055810 A1 | 7/2002 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2007/015669 A3 | 2/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/017281 A1 | 2/2008 |
| WO | WO 2008/150234 A1 | 12/2008 |
| WO | WO 2009/136195 A1 | 11/2009 |
| WO | WO 2010/087752 A1 | 8/2010 |
| WO | WO 2011/151758 A2 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/118075 A1 | 8/2013 |
| WO | WO 2014/072080 A1 | 5/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2016/099396 A1 | 6/2016 |
| WO | WO 2016/175701 A1 | 11/2016 |
| WO | WO 2016/187533 A1 | 11/2016 |
| WO | WO 2017/131574 A1 | 8/2017 |
| WO | WO 2017/138874 A1 | 8/2017 |
| WO | WO 2018/004435 A1 | 1/2018 |
| WO | WO 2018/080387 A1 | 5/2018 |
| WO | WO 2019/125291 A1 | 6/2019 |
| WO | WO 2019/125292 A1 | 6/2019 |

OTHER PUBLICATIONS

U.S. Appl. No. 16/553,350, Peter Derelöv and Johan Svensson, filed Aug. 28, 2019.
U.S. Appl. No. 16/564,438, Hans Brännström, Agne Pålsson and Peter Derelöv, filed Sep. 9, 2019.
U.S. Appl. No. 16/567,436, Peter Derelöv and Mats Nilsson, filed Sep. 11, 2019.
U.S. Appl. No. 16/663,603, Magnus Fridlund, filed Oct. 25, 2019.
U.S. Appl. No. 16/553,325, Derelöv et al.
U.S. Appl. No. 16/553,350, Derelöv et al.
U.S. Appl. No. 16/564,438, Brännström et al.
U.S. Appl. No. 16/567,436, Derelöv.
U.S. Appl. No. 16/663,603, Fridlund.
Derelöv, Peter, U.S. Appl. No. 16/553,325 entitled "Set of Panels with a Mechanical Locking Device," filed Aug. 28, 2019.
Derelöv, Peter, U.S. Appl. No. 16/553,350 entitled "Set of Panels with a Mechanical Locking Device," filed Aug. 28, 2019.
Brännstrom, Hans, et al., U.S. Appl. No. 16/564,438 entitled "Assembled Product and a Method of Assembling the Assembled Product," filed Sep. 9, 2019.
Derelöv, Peter, U.S. Appl. No. 16/567,436 entitled "Panels Comprising a Mechanical Locking Device and an Assembled Product Comprising the Panels," filed Sep. 11, 2019.
Fridlund, Magnus, U.S. Appl. No. 16/663,603 entitled "Element and Method for Providing Dismantling Groove," filed Oct. 25, 2019.
U.S. Appl. No. 16/856,765, Peter Derelöv, filed Apr. 23, 2020.
U.S. Appl. No. 16/856,765, Derelöv.
Derelöv, Peter, U.S. Appl. No. 16/856,765 entitled "Set of Panels with a Mechanical Locking Device," filed Apr. 23, 2020.
U.S. Appl. No. 16/697,335, Christian Boo and Peter Derelöv, filed Nov. 27, 2019.
U.S. Appl. No. 16/703,077, Magnus Fridlund, filed Dec. 4, 2019, (Cited herein as US Patent Application Publication No. 2020/0102978 A1 of Apr. 2, 2020).
U.S. Appl. No. 16/722,096, Peter Derelöv and Christian Boo, filed Dec. 20, 2019.
U.S. Appl. No. 16/697,335, Boo et al.
U.S. Appl. No. 16/722,096, Derelöv et al.
International Search Report/Written Opinion dated Jun. 17, 2019 in PCT/SE2019/050363, ISA/SE, Patent-och registreringsverket, Stockholm, SE, 10 pages.
Boo, Christian, et al., U.S. Appl. No. 16/697,335 entitled "Panels Comprising a Mechanical Locking Device and an Assembled Product Comprising the Panels," filed Nov. 27, 2019.
Derelöv, Peter, et al., U.S. Appl. No. 16/722,096 entitled "Panels Comprising a Mechanical Locking Device and an Assembled Product Comprising the Panels," filed Dec. 20, 2019.
U.S. Appl. No. 14/486,681, Hans Brännström, Agne Pålsson and Peter Derelöv, filed Sep. 15, 1994, (Cited herein as US Patent Application Publication No. 2015/0078807 A1 of Mar. 19, 2015).
U.S. Appl. No. 14/573,572, Christian Boo, filed Dec. 17, 2014, (Cited herein as US Patent Application Publication No. 2015/0198191 A1 of Jul. 16, 2015).
U.S. Appl. No. 15/271,622, Peter Derelöv and Mats Nilsson, filed Sep. 21, 2016, (Cited herein as US Patent Application Publication No. 2017/0079433 A1 of Mar. 23, 2017).

(56) References Cited

OTHER PUBLICATIONS

U.S. Appl. No. 15/308,872, Darko Pervan, filed Nov. 4, 2016, (Cited herein as US Patent Application Publication No. 2017/0089379 A1 of Mar. 30, 2017).
U.S. Appl. No. 15/415,356, Peter Derelöv and Christian Boo, filed Jan. 25, 2017, (Cited herein as US Patent Application Publication No. 2017/0208938 A1 of Jul. 27, 2017).
U.S. Appl. No. 15/422,798, Magnus Fridlund, filed Feb. 2, 2017, (Cited herein as US Patent Application Publication No. 2017/0227035 A1 of Aug. 10, 2017).
U.S. Appl. No. 15/428,469, Magnus Fridlund, filed Feb. 9, 2017, (Cited herein as US Patent Application Publication No. 2017/0227032 A1 of Aug. 10, 2017).
U.S. Appl. No. 15/428,504, Christian Boo, filed Feb. 9, 2017, (Cited herein as US Patent Application publication No. 2017/0227031 A1 of Aug. 10, 2017).
U.S. Appl. No. 15/432,190, Magnus Fridlund, filed Feb. 14, 2017, (Cited herein as US Patent Application Publication No. 2017/0234346 A1 of Aug. 17, 2017).
U.S. Appl. No. 15/642,757, Peter Derelöv, filed Jul. 6, 2017, (Cited herein as US Patent Application Publication No. 2017/0298973 A1 of Oct. 19, 2017).
U.S. Appl. No. 15/646,714, Peter Derelöv, filed Jul. 11, 2017, (Cited herein as US Patent Application Publication No. 2018/0087552 A1 of Mar. 29, 2018).
U.S. Appl. No. 15/562,254, Peter Derelöv, filed Sep. 27, 2017, (Cited herein as US Patent Application Publication No. 2018/0080488 A1 of Mar. 22, 2018).
U.S. Appl. No. 15/567,507, Christian Boo, Peter Derelöv and Agne Pålsson, filed Oct. 18, 2017, (Cited herein as US Patent Application Publication No. 2018/0112695 A1 of Apr. 26, 2018).
U.S. Appl. No. 15/794,491, Peter Derelöv, filed Oct. 26, 2017, (Cited herein as US Patent Application Publication No. 2018/0119717 A1 of May 3, 2018).
U.S. Appl. No. 15/923,701, Peter Derelöv, filed Mar. 16, 2018, (Cited herein as US Patent Application Publication No. 2018/0202160 A1 of Jul. 19, 2018).
U.S. Appl. No. 15/978,630, Jonas Fransson, Niclas Håkansson and Agne Pålsson, filed May 14, 2018, (Cited herein as US Patent Application Publication No. 2018/0328396 A1 of Nov. 15, 2018).
U.S. Appl. No. 16/027,479, Christian Boo and Peter Derelöv, filed Jul. 5, 2018, (Cited herein as US Patent Application Publication No. 2019/0166989 A1 of Jun. 6, 2019).
U.S. Appl. No. 16/220,574, Peter Derelöv, filed Dec. 14, 2018, (Cited herein as US Patent Application Publication No. 2019/0195256 A1 of Jun. 27, 2019).
U.S. Appl. No. 16/220,585, Peter Derelöv, filed Dec. 14, 2018, (Cited herein as US Patent Application Publication No. 2019/0191870 A1 of Jun. 27, 2019).
U.S. Appl. No. 16/228,975, Niclas Håkansson and Darko Pervan, filed Dec. 21, 2018, (Cited herein as US Patent Application Publication No. 2019/0113061 A1 of Apr. 18, 2019).
U.S. Appl. No. 15/956,949, Peter Derelöv, filed Apr. 19, 2018.
U.S. Appl. No. 16/361,609, Peter Derelöv, Johan Svensson and Lars Gunnarsson, filed Mar. 22, 2019.
U.S. Appl. No. 16/386,732, Christian Boo, filed Apr. 17, 2019.
U.S. Appl. No. 16/386,810, Christian Boo, filed Apr. 17, 2019.
U.S. Appl. No. 16/386,874, Peter Derelöv, filed Apr. 17, 2019.
U.S. Appl. No. 15/956,949, Derelöv.
U.S. Appl. No. 16/361,609, Derelöv et al.
U.S. Appl. No. 16/386,732, Boo.
U.S. Appl. No. 16/386,810, Boo.
U.S. Appl. No. 16/386,874, Derelöv.
Derelöv, Peter, U.S. Appl. No. 15/956,949 entitled "Panels for an Assembled Product", filed Apr. 19, 2018.
Derelöv, Peter, et al., U.S. Appl. No. 16/361,609 entitled "Panels Comprising a Mechanical Locking Device and an Assembled Product Comprising the Panels," filed Mar. 22, 2019.
Boo, Christian, U.S. Appl. No. 16/386,732 entitled "Set of Panels With a Mechanical Locking Device," filed Apr. 17, 2019.
Boo, Christian, U.S. Appl. No. 16/386,810 entitled "Set of Panels With a Mechanical Locking Device," filed Apr. 17, 2019.
Derelöv, Peter, U.S. Appl. No. 16/386,874 entitled "Symmetric Tongue and T-Cross," filed Apr. 17, 2019.
U.S. Appl. No. 17/154,344, Peter Derelöv and Johan Svensson, filed Jan. 21, 2021.
U.S. Appl. No. 17/173,823, Peter Derelöv and Johan Svensson, filed Feb. 11, 2021.
U.S. Appl. No. 17/185,428, Johan Svensson and Peter Derelöv, filed Feb. 25, 2021.
U.S. Appl. No. 17/185,403, Johan Svensson and Peter Derelöv, filed Feb. 25, 2021.
U.S. Appl. No. 17/154,344, Derelöv et al.
U.S. Appl. No. 17/173,823, Derelöv et al.
U.S. Appl. No. 17/185,428, Svensson et al.
U.S. Appl. No. 17/185,403, Svensson et al.
Derelöv, Peter, et al., U.S. Appl. No. 17/154,344 entitled "Set of Panels with a Mechanical Locking Device," filed Jan. 21, 2021.
Derelöv, Peter, et al., U.S. Appl. No. 17/173,823 entitled "Machine," filed Feb. 11, 2021.
Svensson, Johan, et al., U.S. Appl. No. 17/185,428 entitled "Set of Panels with a Mechanical Locking Device," filed Feb. 25, 2021.
Svensson, Johan, et al., U.S. Appl. No. 17/185,403 entitled "Set of Panels with a Mechanical Locking Device," filed Feb. 25, 2021.

\* cited by examiner

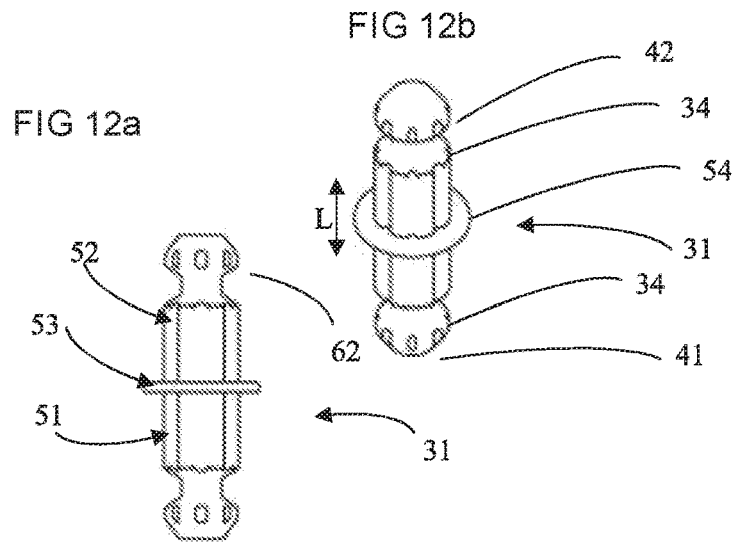
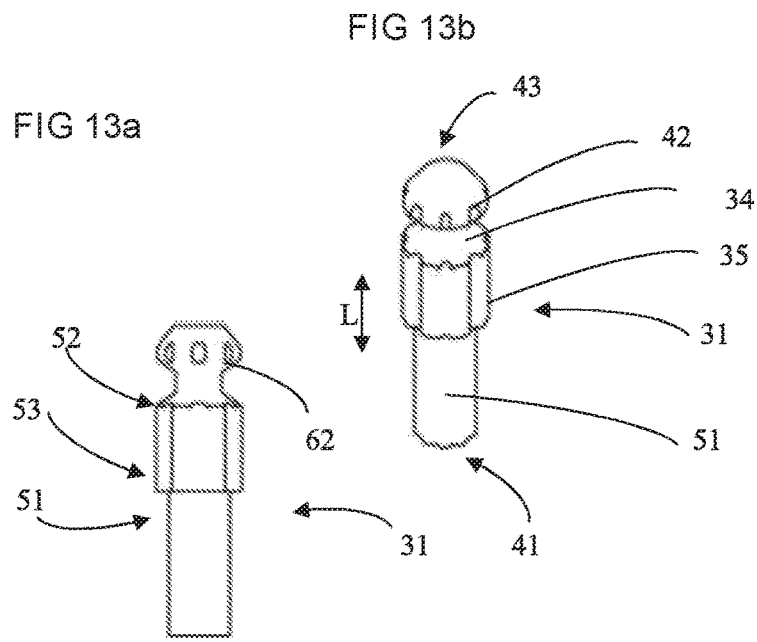
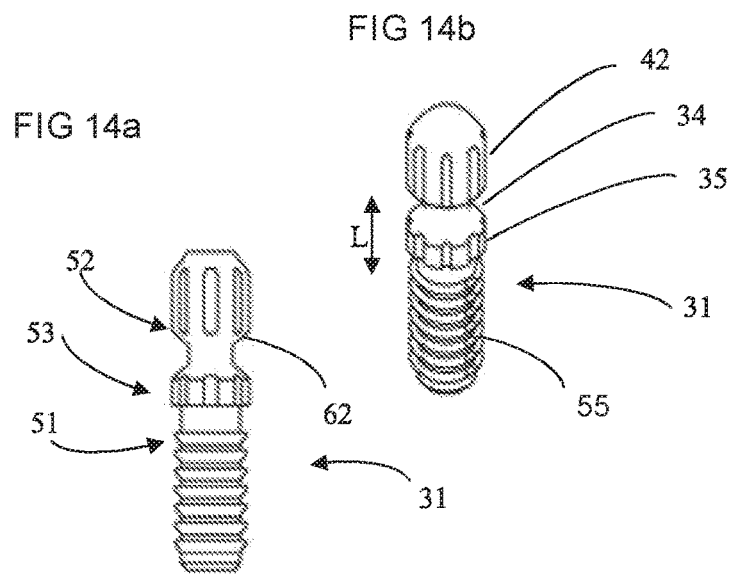

SET OF PANELS WITH A MECHANICAL LOCKING DEVICE

CROSS REFERENCE TO RELATED APPLICATIONS

The present application claims the benefit of Swedish Application No. 1850447-2, filed on 18 Apr. 2018. The entire contents of each of Swedish Application No. 1850445-6, Swedish Application No. 1850446-4, and, Swedish Application No. 1850447-2 are hereby incorporated herein by reference in their entirety.

TECHNICAL FIELD

Embodiments of the present invention relate to panels that may be arranged perpendicular to each other and locked together with a mechanical locking device. The panels may be assembled and locked together to obtain a furniture product, such as a bookshelf, a cupboard, a wardrobe, a box, a drawer or a furniture component and may thereafter be dismantled. The mechanical locking device may comprise a flexible tongue.

TECHNICAL BACKGROUND

A furniture product provided with a mechanical locking device is known in the art, as evidenced by WO2015/038059. The furniture product comprises a first panel connected perpendicular to a second panel by a mechanical locking device comprising a flexible tongue in an insertion groove.

The above description of various known aspects is the applicant's characterization of such, and is not an admission that any of the above description is considered as prior art Embodiments of the present invention address a need to provide panels that can be assembled and dismantled.

SUMMARY

It is an object of certain aspects of the present invention to provide an improvement over the above described techniques and known art; particularly, achieve a set that could be dismantled/disassembled after assembly without damage the mechanical locking device, such that the set yet again could be assembled.

It is an object of at least certain embodiments and aspects of the present invention to provide an improvement over the above described techniques and known art.

A further object of at least certain aspects of the present invention is to facilitate assembling of panels configured to be assembled without the need of using any tools.

A further object of at least certain aspects of the present invention is to facilitate dismantling of panels configured to be assembled.

A further object of at least certain aspects of the present invention is to facilitate assembling and dismantling of panels configured to be assembled with a locking device that is easy to manufacture and to use.

A further object of at least certain aspects of the present invention is to facilitate a method of dismantling assembled panels.

At least some of these and other objects and advantages that will be apparent from the description have been achieved by a set comprising a first panel, a second panel and a mechanical locking device for locking the first panel to the second panel, wherein the first panel comprises a first edge surface and a first panel surface, the second panel comprises a second panel surface, the first edge surface is facing the second panel surface in a locked position of the first and the second panel, the mechanical locking device comprises an panel groove at the second panel surface, a flexible tongue positioned in the panel groove, a rod-shaped element at the first edge surface and an insertion groove at the second panel surface extending from the second panel surface to the panel groove, the rod-shaped element is configured to be inserted into the insertion groove and the rod-shaped element comprises a recess, the flexible tongue is configured to cooperate with the recess for a locking of the first panel to the second panel in a first direction which is perpendicular to the second panel surface, and the panel groove extending at an angle in the second panel in view of the second panel surface. The set can hereby be dismantled after assembly. This opens up for that that a set, or a product comprising one or more sets, can be dismantled and thus easier to move or to alter how the set is assembled. This also opens up for that the panels can be reused in different ways.

According to an aspect the angle is between 10-80 degrees.

According to an aspect the angle is between 30-70 degrees. According to an aspect the angle is between 10-70 degrees. According to an aspect the angle is between 15-50 degrees. According to an aspect the angle is between 25-35 degrees.

According to an aspect the second panel comprises a second edge surface at a distance from the panel groove.

According to an aspect a width of the panel groove in the second panel surface is smaller than a width of the first edge surface.

According to an aspect a width of the panel groove in the second panel surface is larger than a diameter of the rod-shaped element.

According to an aspect the panel groove is a bottom-ended groove, comprising a bottom surface which is positioned at a distance from the insertion groove.

According to an aspect the flexible tongue is arranged at the bottom surface of the panel groove.

According to an aspect the flexible tongue is configured to be flexed inwards towards the bottom surface to be completely positioned in the panel groove.

According to an aspect the flexible tongue, in an unflexed state, is configured to be position partly in the panel groove and partly in the insertion groove.

According to an aspect the insertion groove is a longitudinal groove that extends in a longitudinal direction of the second planar surface.

According to an aspect the longitudinal direction of the longitudinal groove is substantially parallel to the second edge surface.

According to an aspect the second panel comprises a third edge surface and that the panel groove of the mechanical locking device further is positioned at the third edge surface.

According to an aspect the second panel comprises a fourth edge surface and that the panel groove of the mechanical locking device further is positioned at the fourth edge surface.

According to an aspect the panel groove extend from the third edge surface to the fourth edge surface.

According to an aspect the insertion groove is a bottom-ended groove, such as a bottom ended drill hole, comprising a bottom surface which is positioned at a distance from the panel groove.

According to an aspect the first edge surface comprises two or more of said rod-shaped element and the second panel surface comprises two or more of said insertion groove, preferably arranged linearly, wherein each of the rod-shaped elements is configured to be inserted into one of the insertion grooves.

According to an aspect, in the locked position, the panel groove is configured to receive a dismantling-rod.

According to an aspect, when the dismantling rod is received in the panel groove, the rod-shaped element is configured to cooperate with the dismantling-rod for flexing the flexible tongue inwards in the panel groove, According to an aspect, when the flexible tongue is flexed inwards in the panel groove, the rod-shaped element and the dismantling-rod is configured to be moveable outwards in the insertion groove and out of the insertion groove to dismantle the first panel from the second panel.

According to an aspect the mechanical locking device is configured to automatically lock the first panel to the second panel when the rod-shaped element is inserted into the insertion groove and the first edge surface is arranged against the second panel surface.

According to an aspect the flexible tongue is arranged between the recess and the bottom surface of the panel groove in the locked position.

According to an aspect the rod-shaped element is configured to be attached in an attachment groove in the first edge surface.

According to an aspect the second edge surface is essentially perpendicular to the second panel surface.

Further, at least some of these and other objects and advantages that will be apparent from the description have been achieved by a method for dismantling a set in accordance to any of the above aspects from a locked position to a dismantled position, comprising inserting a dismantling-rod into the edge groove and move the flexible tongue out of the recess of the rod-shaped element by flexing the flexible tongue inwards in the edge groove, move the rod-shaped element and the dismantling-rod outwards in the insertion groove and out of the insertion groove to dismantle the first panel from the second panel.

According to an aspect the flexible tongue is according to the flexible tongue described and shown in FIGS. 2A-2F in WO2015/105449. FIGS. 2A-2F and the related disclosure from page 6, line 15 to page 7, line 2, in WO2015/105449 are hereby expressly incorporated by reference herein.

According to an aspect the core of the first panel and/or of the second panel may be a wood-based core, preferably made of MDF, HDF, OSB, WPC, plywood or particleboard. The core may also be a plastic core comprising thermosetting plastic or thermoplastic e.g. vinyl, PVC, PU or PET. The plastic core may comprise fillers.

The first panel and/or the second panel may also be of solid wood.

The first panel and/or the second panel may be provided with a decorative layer, such as a foil or a veneer, on one or more surfaces.

At least some of the above identified and other objects and advantages that may be apparent from the description have been achieved by a locking device for a furniture product in accordance with the above.

BRIEF DESCRIPTION OF THE DRAWINGS

These and other aspects, features and advantages of which embodiments of the invention are capable of, will be apparent and elucidated from the following description of embodiments and aspects of the present invention, reference being made to the accompanying drawings, in which

FIGS. 12a-12b show a side view and a 3D view from above of a rod-shaped element according to an aspect of the invention.

FIGS. 13a-13b show a side view and a 3D view from above of a rod-shaped element according to an aspect of the invention.

FIGS. 14a-14b show a side view and a 3D view from above of a rod-shaped element according to an aspect of the invention.

DETAILED DESCRIPTION

Figure 1A:
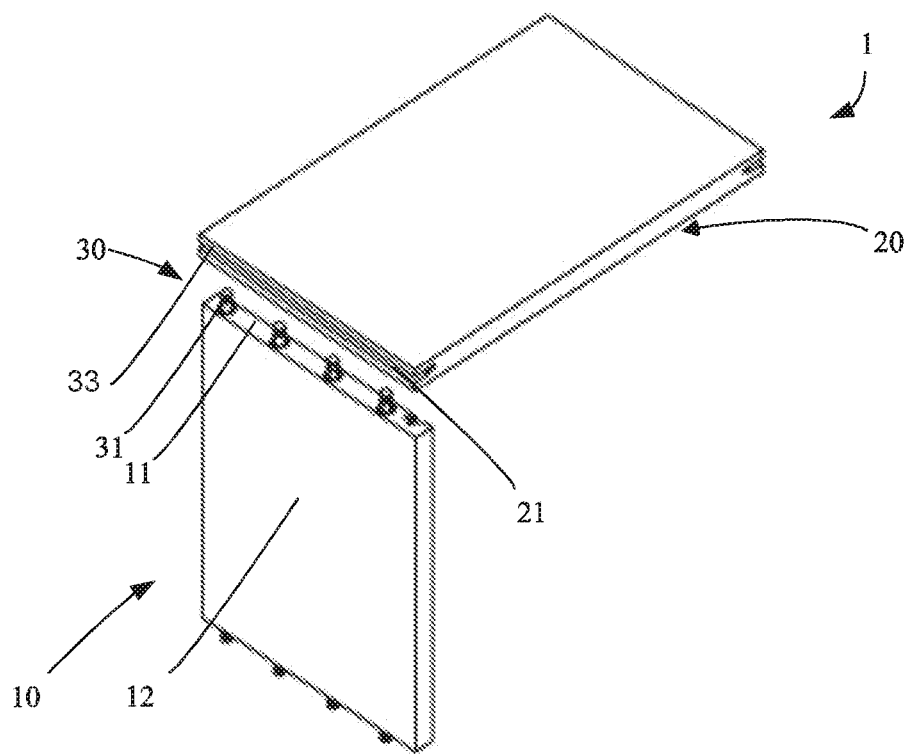
FIG. 1a shows a 3D view from above of a set in an unassembled/dismantled state of an aspect of the invention.

Aspects of the present disclosure will be described more fully hereinafter with reference to the accompanying drawings. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation, for example, definition of dimensions such as width or breadth or height or length or diameter depends on how exemplary aspects are depicted, hence, if depicted differently, a shown width or diameter in one depiction is a length or thickness in another depiction.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

The different aspects, alternatives and embodiments of the invention disclosed herein can be combined with one or more of the other aspects, alternatives and embodiments described herein. Two or more aspects can be combined.

A first embodiment of the invention is shown in FIGS. 1a-4 including a set 1 comprising a first panel 10, a second panel 20 and a mechanical locking device 30 for locking the first panel 10 to the second panel 20. The first panel 10 comprises a first edge surface 11 and a first panel surface 12. The second panel 20 comprises a second edge surface 21 and a second panel surface 22. The first edge surface 11 is facing the second panel surface 22 in a locked position of the first and the second panel 10, 20. The mechanical locking device 30 comprises a rod-shaped element 31 at the first edge surface 11 and an insertion groove 32 at the second panel surface 22. The mechanical locking device 30 further comprises an edge groove 33 at the second edge surface 21 and a flexible tongue 6 positioned in the edge groove 33. The rod-shaped element 31 comprises a recess 34. The rod-shaped element 31 is configured to be inserted into the insertion groove 32. The flexible tongue 6 is configured to cooperate with the recess 34 for a locking of the first panel 10 to the second panel 20 in a first direction which is perpendicular to the second panel surface 22.

The first panel 10 and the second panel 20 are preferably panels for a furniture product and may be a part of a frame of a furniture product.

The set 1 is preferably configured for locking the first panel 10 to the second panel 20 with the first panel surface 12 perpendicular or essentially perpendicular to the second panel surface 22.

Figure 1B:
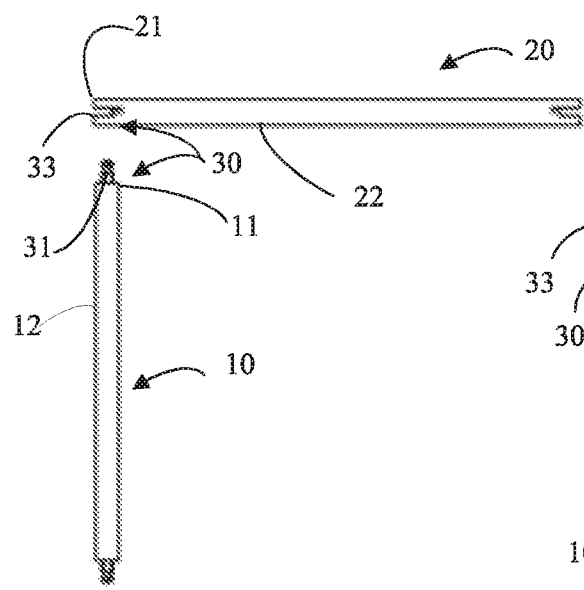
FIG. 1b shows a side view of a set in an unassembled/dismantled state of an aspect of the invention.
Figure 1C:
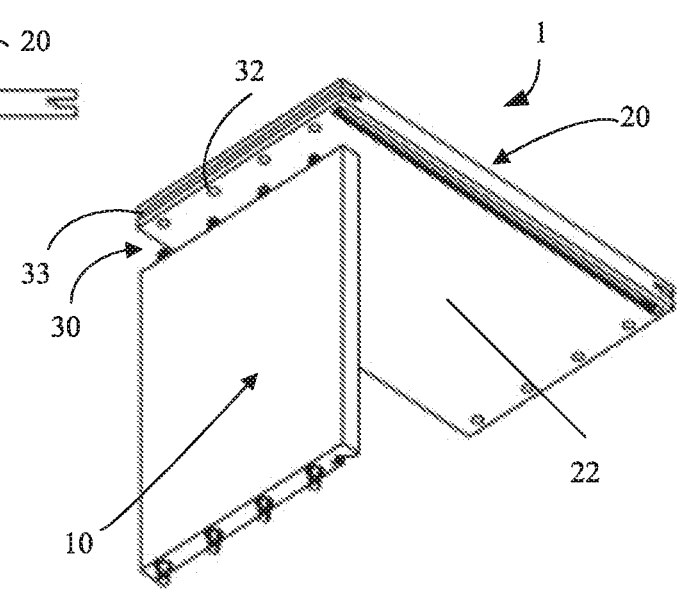
FIG. 1c shows a 3D view from below of a set in an unassembled/dismantled state of an aspect of the invention.
Figure 2A:
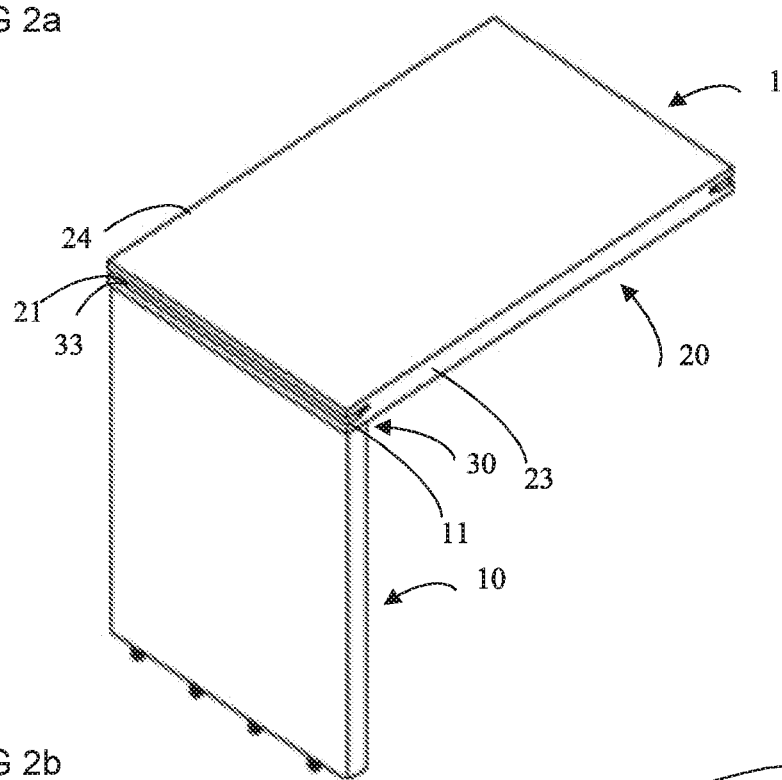
FIG. 2a shows a 3D view from above of a set in an assembled state of an aspect of the invention.
Figure 2B:
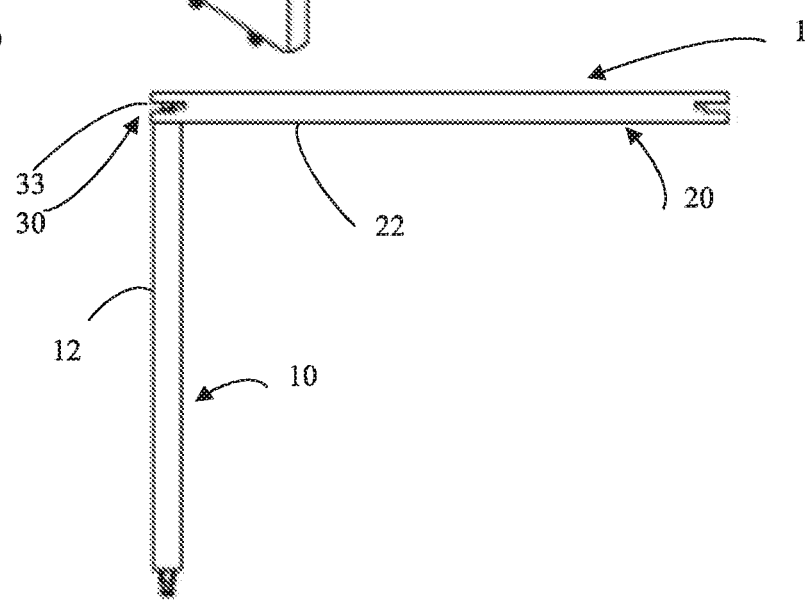
FIG. 2b shows a side view of a set in an assembled state of an aspect of the invention.

FIGS. 1a-c disclose the set according to an aspect in an unassembled or dismantled state. FIGS. 2a-b disclose the set according to an aspect in an assembled state. The set 1 may be assembled by displacing the first panel 10 relative the second panel 20 in a direction which is perpendicular to the second panel surface 22. The mechanical locking device 20 may be configured to automatically lock the first panel 10 to the second panel 20 when the rod-shaped element 31 is inserted into the insertion groove 32 and the first edge surface 11 is arranged against the second panel surface 22.

The insertion groove 32 may be formed in the second panel surface 22 and in a core of the second panel 20.

The second panel surface 22 may comprise a decorative layer and the insertion groove may extend though the decorative layer.

The insertion groove may be formed by mechanical cutting, such as drilling.

Figure 3:
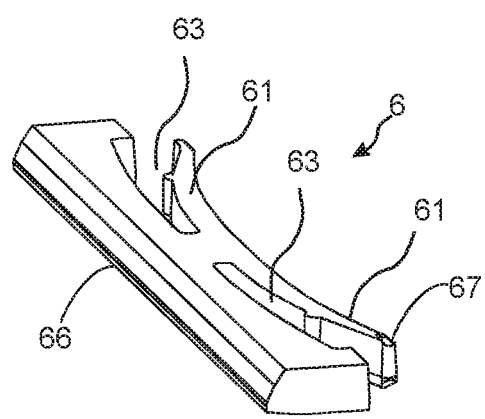
FIG. 3 shows an embodiment of a flexible tongue according to an aspect of the invention.

An aspect of the flexible tongue 6 is shown in FIG. 3. A first part of the flexible tongue 6 is configured to cooperate with the edge groove 33 and a second part is configured to cooperate with the recess 34 of the rod-shaped element 31.

The second part may comprise a first bevel 65, which is configured to cooperate with the rod-shaped element 31 during assembling, and a second bevel 64, which is configured to cooperate with the recess 34 for the locking.

The flexible tongue 6 may comprise a flexible material to enable compression and a displacement of the flexible tongue 6 in the edge groove 33 during assembling and dismantling.

The flexible tongue 6 may comprise an element which is flexible to enable compression and a displacement of the flexible tongue 6 in the edge groove 33 during assembling and dismantling and another element which is less flexible in order to improve the locking strength.

A part of a curved surface of an embodiment of the flexible tongue 6 may be configured to be displaced against a surface, such as a cylindrical surface, of the edge groove 33. An embodiment is shown in WO2018/080387. The entrie contents of WO2018/080387 are hereby expressly incorporated by reference.

The flexible tongue 6 may comprise a first essentially straight edge and a second edge which comprises a bendable part 61, preferably a first bendable part and a second bendable part. The first edge is preferably configured to cooperate with the recess 34 of the rod-shaped element 31. The flexible tongue preferably comprises a recess 63 at each of said bendable parts. An advantage with this embodiment of the flexible tongue is that a stronger spring force may be obtained which may provide a stronger locking.

A locking surface of the flexible tongue 6 may cooperate with a locking surface 62 of the recess 34 for the locking of the first panel 10 to the second panel 20.

The first edge surface 11 may comprise two or more of said rod shaped element 31 and the second panel surface 22 may comprise two or more of said insertion groove 32, preferably arranged linearly, wherein each of the rod-shaped elements 31 is configured to be inserted into one of the insertion grooves 31.

An aspect of the rod-shaped element 31 is shown in FIG. 6a-e which comprises an embodiment of the recess 34. The rod-shaped element 31 has a longitudinal shape with a length direction L, which is parallel to the first panel surface. A first crosscut of the rod-shaped element 31, in a plane parallel to the second panel surface 21 may have a circular shape, a rectangular shape, a star shape, an oval shape or a hexagon shape. The crosscut may be between the recess 34 and the edge 11.

A locking of the first panel 10 to the second panel 20 in a second direction which is perpendicular to the first panel surface 12 may be obtained by cooperating locking surfaces between the insertion groove 32 and the rod-shaped element 31.

A locking of the first panel to the second panel in a third direction which is perpendicular to the first direction and the second direction surface may be obtained by cooperating locking surfaces between the insertion groove 32 and the rod-shaped element 31.

A second cross cut of the insertion groove 32, in a plane parallel to the second panel surface, preferably has a shape that matches a first cross cut of the rod-shaped element 31, in a plane parallel to the second panel surface. An advantage of this may be that an improved locking of the first panel 10 to the second panel 20 in a second direction is obtained and/or an improved locking of the first panel 10 to the second panel 20 in a third direction is obtained.

Figure 4:
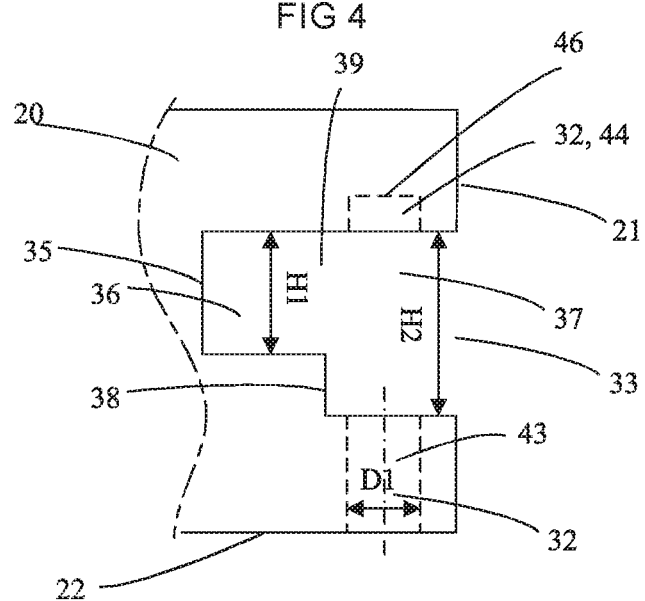
FIG. 4 shows a side view of an enlargement of a part of the first panel.

The edge groove 33 and the insertion groove 32 are disclosed in more detail in FIG. 4, which is a cross cut along the insertion groove 32.

The edge groove 33 extends from the second edge surface 21 of the second panel 20 inwards in the second panel 20. The edge groove 33 comprises an inner part 36 and an outer part 37. The inner part 36 of the edge groove has a first height H1. The outer part 37 of the edge groove has a second height H2. The height of the inner and outer part is seen in a direction that is parallel with the second end surface 21. Put in another way the height of the inner and outer part H1, H2 extend in the thickness of the second panel. The second height H2 of the outer part 37 is larger than the first height H1 of the inner part 36. The outer part 37 is located closer to the second edge surface than the inner part.

The inner part 36 of the edge groove 33 may comprise a first surface, an opposite second surface and a bottom surface 35 extending between the first surface and the opposite second surface. According to an aspect the edge groove 33 is a bottom-ended groove comprising the bottom surface 35.

The bottom surface 35 may be positioned at a distance from the insertion groove 32.

The outer part 37 of the edge groove 33 may comprise a first surface, an opposite second surface and a bottom surface 38 extending between the first surface and the opposite second surface. The bottom surface 38 of the second part 37 comprises an opening 39 of the first part 36.

According to an aspect the height H1 of the inner part 36 of the edge groove 33 is equal to or larger than a thickness of the flexible tongue 6.

According to an aspect the rod shaped element 31 is connected to the first edge surface 11 at a first end 41 and comprise a rod surface 42 positioned between the recess 34 and a second end 43 of the rod-shaped element 31.

According to an aspect the difference between the second height H2 of the outer part 37 of the edge groove 33 and the first height H1 of the inner part 36 of the edge groove 33 is equal to or larger than a length of the rod surface 41 between the recess 34 and the second end 43 of the rod-shaped element 31.

According to an aspect the difference between the second height H2 of the outer part 37 of the edge groove 33 and the first height H1 of the inner part 36 of the edge groove 33 is or equal to or larger than a distance from an outer tip 66 of the flexible tongue 6 and a surface 67 of the flexible tongue 6 which cooperate with a surface of the inner part 36 of the edge groove 33. According to an aspect the difference between the second height H2 of the outer part 37 of the edge groove 33 and the first height H1 of the inner part 36 of the edge groove 33 is or equal to or larger than a distance from an outer tip of the flexible tongue and the locking surface 62 of the flexible tongue 6.

According to an aspect the second height H2 of the outer part 37 of the edge groove 33 is 1.1-2.5 times larger than the first height H1 of the inner part 36. According to an aspect the second height H2 of the outer part 37 of the edge groove 33 is 1.1-1.5 times larger than the first height of the inner part.

According to an aspect the flexible tongue 6 is arranged at the bottom surface 35 of the edge groove 33.

Figure 6A:
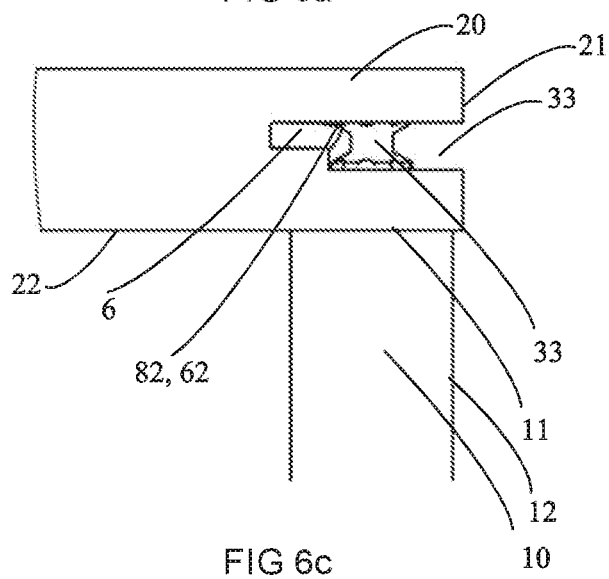
FIGS. 6a-6e show an enlargement of a part of the set and the dismantling-rod during dismantling of the set from an assembled state to a dismantled state.
Figure 6B:
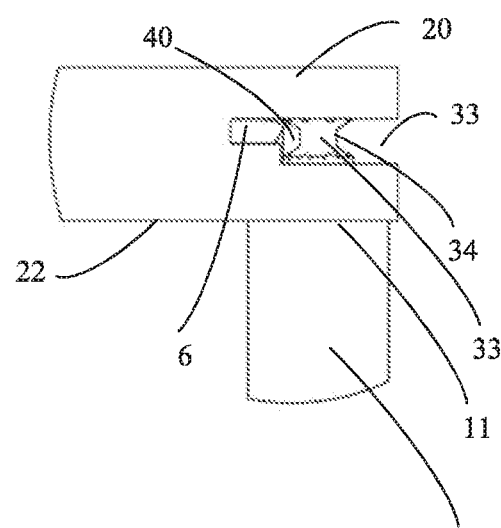
Figure 6C:
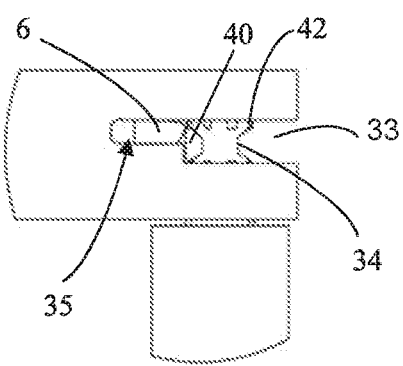
Figure 6D:
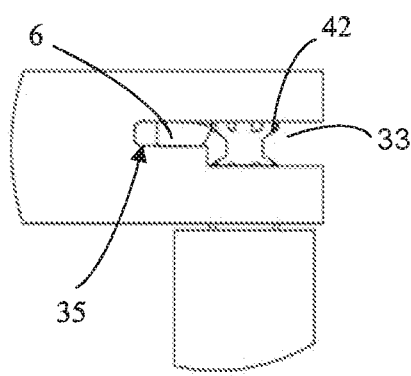

According to an aspect the flexible tongue 6 is configured to be flexed inwards towards the bottom surface 35 to be completely positioned in the inner part 36 of the edge groove 33, as disclosed in FIGS. 6b,c,d.

According to an aspect the flexible tongue 6, in an unflexed state, is configured to be position partly in the outer part 37 and partly in the inner part 37 of the edge groove, as disclosed in FIGS. 6a and e.

According to an aspect the edge groove 33 is a longitudinal groove 33 that extends in a longitudinal direction of the second edge surface 22, as disclosed in FIGS. 1a,c and 2a.

According to an aspect second panel 20 comprise a third edge surface 23. According to an aspect the edge groove 33 of the mechanical locking device 30 further is positioned at the third edge surface 23 as disclosed in FIG. 2a.

According to an aspect the second panel 20 comprises a fourth edge surface 24. According to an aspect the edge groove 33 of the mechanical locking device 30 further is positioned at the fourth edge surface 24, as disclosed in FIG. 2a. According to an aspect the edge groove 33 extends from the third edge surface 23 to the fourth edge surface 24.

The bendable part 61 of the flexible tongue 6 may be arranged at the bottom surface 35 of the edge groove 33.

The flexible tongue 6 may be arranged at the bottom surface 35 of the edge groove 33.

The flexible tongue may be arranged between the recess 34 and the bottom surface 35 of the edge groove in the locked position.

A part of the flexible tongue 6 may be configured to be displaced against a surface of the edge groove 35, such as the first surface and/or the second surface.

According to an aspect and as disclosed in FIG. 12a,b; 13a,b; 14a,b, the rod-shaped element 31 have a longitudinal shape with the length direction L which is parallel to the first panel surface 12. The rod-shaped element 31 comprises a first part 51 at the first end 41 and a second part 52 at the second end 43. The recess 34 is according to an aspect comprised in the second part 52.

Figure 6E:
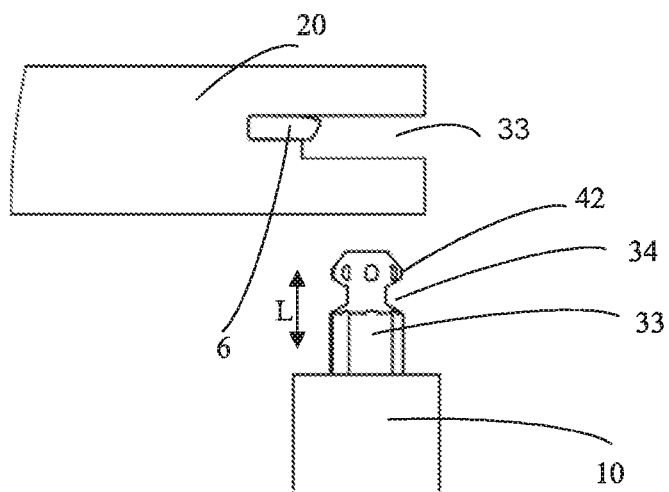
Figure 7A:
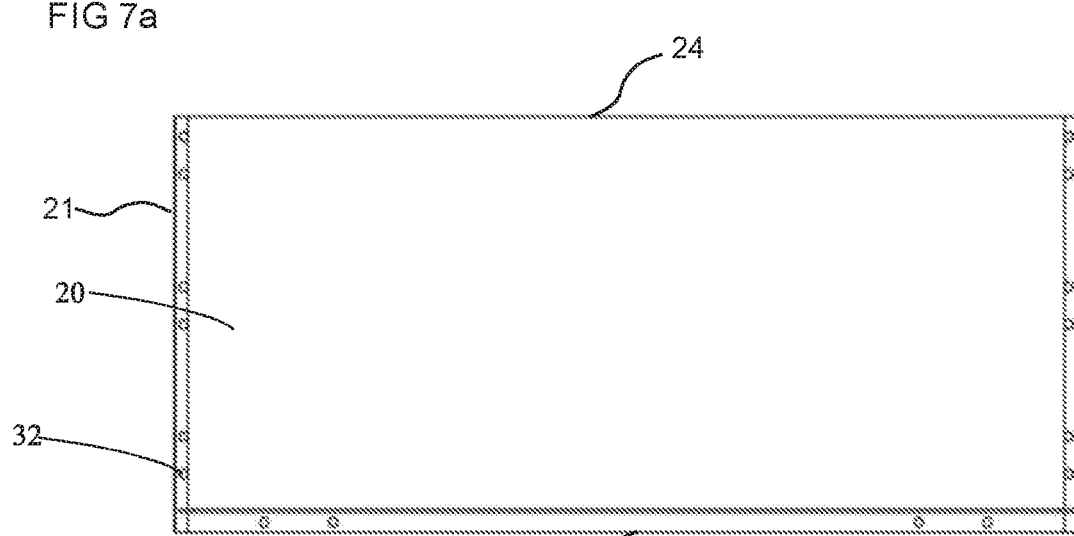
FIGS. 7a-7b show view from above and a side view of an embodiment of the second panel according to an aspect of the invention.
Figure 7B:
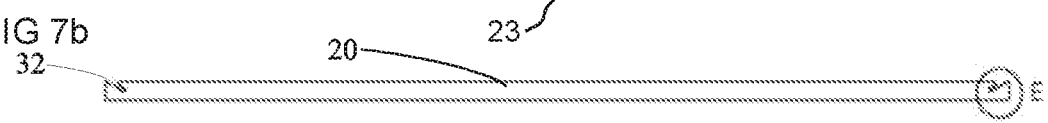
Figure 8A:
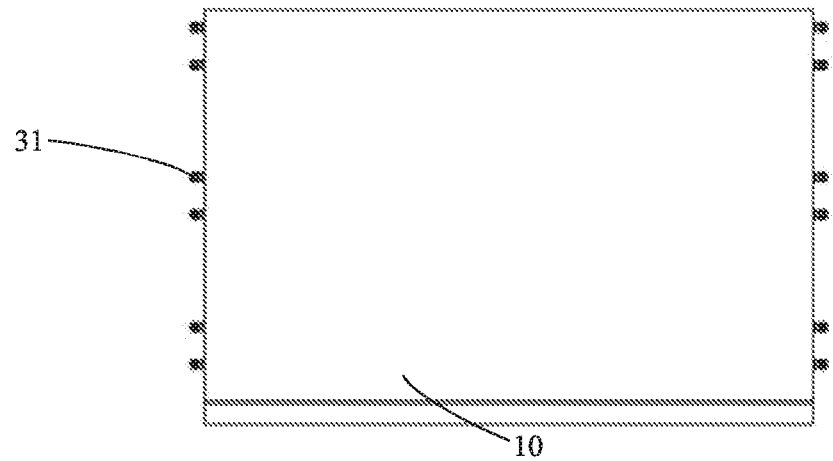
FIGS. 8a-8b show view from above and a side view of an embodiment of the first panel according to an aspect of the invention.
Figure 8B:
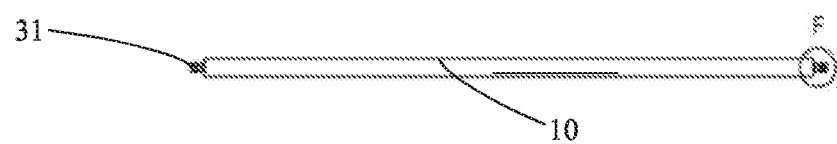
Figure 18A:
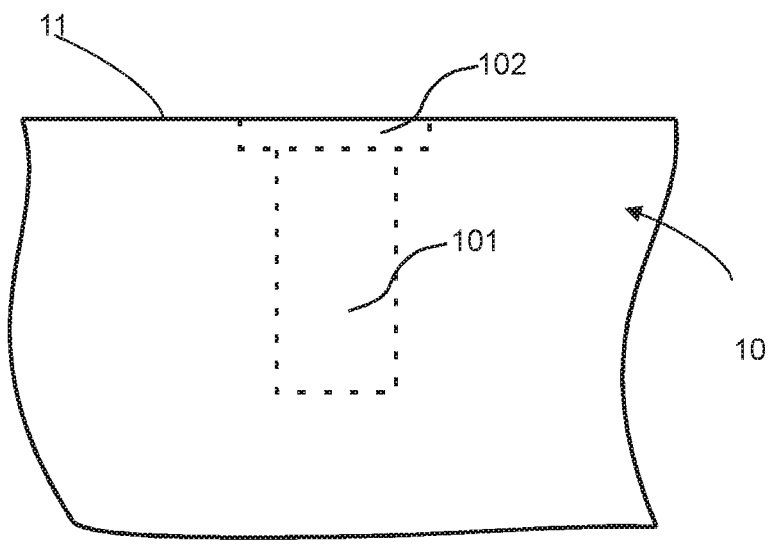
FIGS. 18a-18b show a side view and a top view of an embodiment of the attachment groove.
Figure 18B:
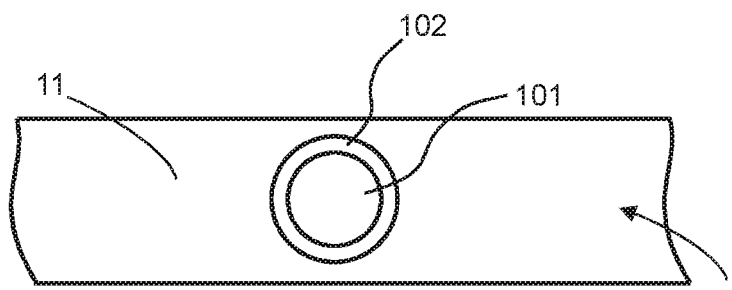

The first part 51 of the rod-shaped element 31 is configured to be inserted into an attachment groove 101 in the first edge surface 11, as disclosed in FIG. 1a, 6e 8a,b, 10, 18a and 18b. FIG. 18a shows a side view and FIG. 18b shows a top view of a part of an embodiment of the first panel 10. The second part 52 of the rod-shaped element 31 is according to an aspect configured to be inserted into the insertion groove 32. According to an aspect the rod shaped element 31 comprises a third part 53. The third part is located between the first and second part 51, 52. The third part 53 has according to an aspect an extension perpendicular to the length direction L that is larger than the extension of the attachment groove 101 in the first edge surface 11 in the corresponding direction. By having a larger extension the third part is configured to restrict/define/limit the depth that the first part 51 could be inserted into the attachment groove 101. By limiting the length the rod-shaped element 31 could be inserted into the attachment groove 101 in the first panel 10, the depth of the attachment groove 101 does not define the position of the rod-shaped element 31 as long as the depth is larger than the first part 51. This opens up for that the attachment groove 101 could be manufactured with large tolerances without affecting the position of the rod-shaped element in the insertion groove 32. This will lower the production costs of the set.

According to an aspect, as disclosed in FIGS. 13a,b; 14a,b, the third part 53 is integrated in the second part 52. According to an aspect the extension perpendicular to the length direction L of the third part 53 is equal to the extension of the second part 52 in the corresponding direction.

According to an aspect, as disclosed in FIGS. 12*a,b*, the extension perpendicular to the length direction L of the third part 53 is larger than the extension D1 of the insertion groove 32 in the corresponding direction, such that the third part 53 is configured to restrict/define/limit the depth that the second part 52 could be inserted into the insertion groove 32. By this the length of the rod-shaped element 31 that could be inserted into the insertion groove 32 is limited and defined and lower the tolerances on the set 1 for positioning the rod-shaped element 31 in an intended locking position in view of the flexible tongue 6.

According to an aspect the third part 53 comprise a flange 54 extending perpendicular to the length direction L.

According to an aspect the flange 54 is a circumferential flange 54.

According to an aspect the flange 54 is rectangular, square, triangular, or star shaped.

According to an aspect the first edge surface 11 comprise a counterbore 102 corresponding to a shape of the third part 53.

Figure 18C:
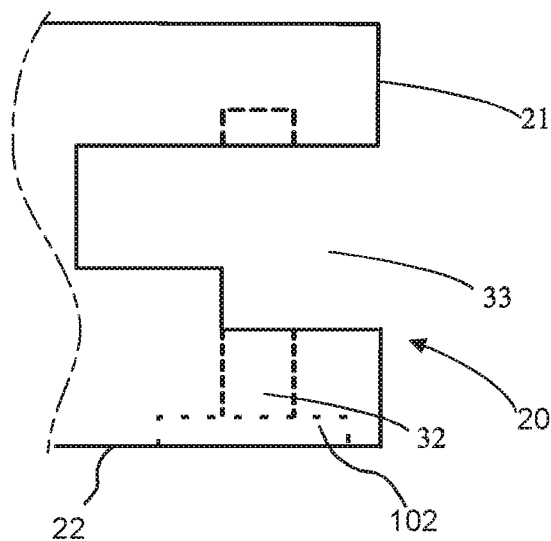
FIG. 18c shows a side view of a part of an embodiment of the second panel.

According to an aspect the second panel surface 22 of the second panel 20 may comprise a counterbore 102 corresponding to a shape of the third part 53. FIG. 18*c*. shows a sideview of a part of the second panel 20.

According to an aspect a depth of the counterbore 102 of the first edge surface 11 and/or the second panel surface 22 is equal to a thickness of the third part 53 in the length direction L.

According to an aspect the first, second and third part 51, 52, 53 of the rod-shaped element 31 is made in one piece.

According to an aspect the attachment groove 101 is a bottom-ended groove, such as a bottom ended drill hole, comprising a bottom surface which is positioned at a distance from the first edge surface 11 that is larger than a length of the first part 51 in the length direction L.

According to an aspect the first part 51 of the rod-shaped element 31 is configured to be attached to the attachment groove 101 by friction.

According to an aspect the rod-shaped element 31 is made from one or more of a wood based material, a polymer material, preferably with a reinforcement material, such as glass fibre or a metal.

According to an aspect one or more of the first, second and third part 51, 52, 53 of the rod-shaped element 31 has a substantial circular shape.

According to an aspect the rod-shaped element 31 may be configured to be glued in the attachment groove 101 in the first edge surface 11.

According to an aspect the first part 51 of the rod-shaped element 31 comprises threads. According to an aspect the first part 51 of the rod-shaped element 31 comprise barbs 54, as disclosed in FIGS. 14*a,b*. According to an aspect the rod-shaped element 31 is configured to be locked in the attachment groove 101 by a friction connection or by a mechanically connection, such as the threads or by a locking element, such as the barbs 54.

The insertion groove 32 is according to an aspect a bottom-ended groove, such as a bottom ended drill hole, comprising a bottom surface 46, which is positioned at a distance from the edge groove 33.

The insertion groove 32 may have a first part 43 on a first side of the edge groove 33 and a second part 44 on a second side of the edge groove 33, wherein the second part comprises the bottom surface 46 and side walls, wherein, in a locked position, the rod-shaped element 31 passes through the first part 43 of the insertion groove 32, through the edge groove 33 and into the second part 44 of the insertion groove 32.

FIG. 6*a* shows a cross cut of the first panel 10 and the second panel 20 in a locked position, i.e. in an assembled position. The insertion groove according to an aspect extends from the second panel surface 22 to the edge groove 33.

The rod-shaped element 31 may be configured to cooperate, for the locking in the second direction, with the side walls the second part 44 of the insertion groove 32.

The rod-shaped element 31 may be configured to cooperate, in a locked position, with the bottom surface 46.

The first part 43 of the insertion groove 32 may comprise side walls, wherein the rod-shaped element 31 may be configured to cooperate, for the locking in the second direction, with side walls of the first part 43.

The sidewalls may comprise material of the core of the second panel 20.

The second edge surface 21 may be essentially perpendicular to the second panel surface 22.

According to an aspect the first panel 10 may be assembled by displacing the first panel 10 relative the second panel 20 in a direction which is perpendicular to the second panel surface 22. The mechanical locking device 30 is according to an aspect configured to automatically lock the first panel 10 to the second panel 20 when the rod-shaped element 31 is inserted into the insertion groove 32 and the first edge surface 11 is arranged against the second panel surface 22.

According to an aspect the assembled first and second panel 10, 20 may be dismantled from each other. Put in another way, after the first and second panel 10, 20 has been assembled, they could be disassembled and separated. After they have been dismantled, they could be assembled together once again or assembled with another panel.

Figure 5A:
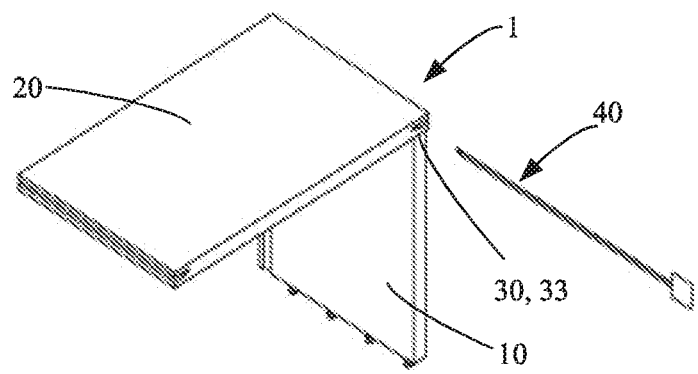
FIGS. 5a-5b show a 3D view from above of a set and a dismantling-rod according to an aspect of the invention during dismantling of the set.
Figure 5B:
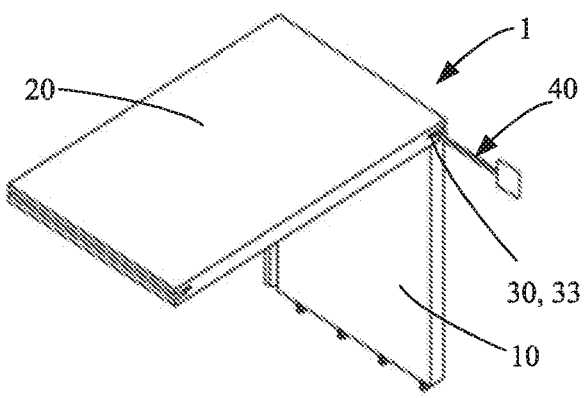

Hereafter the method of dismantling the first panel 10 from the second panel 20 will be described with reference to FIGS. 5*a,b* and 6*a-e*.

In the assembled position the outer part 37 of the edge groove 33 is configured to receive a dismantling-rod 40. The dismantling-rod 40 is a rod shaped element that is insertable in the outer part 37 of the outer groove 33. The dismantling-rod has a longitudinal shape with a first end and a second end. The second end of the dismantling-rod 40 is adapted to be gripped by a user and the first end is adapted to be inserted into the edge groove 33. The cross sectional shape of the dismantling-rod 40 in a direction perpendicular to its longitudinal length is according to an aspect a polygon, for instance a trapezoid as disclosed in FIGS. 6*b* and 6*c*. According to an aspect the cross sectional shape of the dismantling-rod 40 in a direction perpendicular to its longitudinal length is round, square, rectangular or triangular.

According to an aspect the dismantling-rod 40 is flexible such that it is insertable into the edge groove 33 from the second edge surface 21. As the dismantling rod 40 is inserted from the second edge surface it flexes and bends such that it is positioned at the flexible tongue 6 and the recess 34. According to an aspect the dismantling-rod 40 is insertable into the edge groove 33 from the third edge surface 23. According to an aspect the dismantling-rod 40 is insertable into the edge groove 33 from the fourth edge surface 24.

When a user should dismantle the first panel 10 from the second panel 20 and thus unlock the mechanical locking device 30, the user inserts the first end of the dismantling-rod 40 into the outer part 37 of the edge groove 33. When the dismantling rod 40 is inserted and received in the edge groove 33, the rod-shaped element 31 is configured to cooperate with the dismantling-rod 40 for flexing the flexible tongue 6 inwards in the edge groove 33.

When the dismantling-rod 40 is inserted into the outer part 37, it makes contact with the recess 34 of the rod-shaped element 31 and the flexible tongue 6. The shape of the dismantling-rod 40 corresponds to the shape of the recess 34 and when the dismantling-rod 40 is inserted further into the outer part 37 it will be positioned in the recess 34 and flex the flexible tongue 6 out of the recess 34 towards the inner part 36 of the edge groove 33, as disclosed in FIG. 6b.

When the flexible tongue 6 is flexed inwards in the edge groove 33, the rod-shaped element 31 is configured to be moveable in the insertion groove 32, as disclosed in FIG. 6b. According to an aspect and the orientation of the set, the rod-shaped element is moveable upwards or downwards, i.e. it is moveable outwards in the direction of the first edge surface 11. As the rod-shaped element 31 is moved the dismantling-rod 40 will after being moved a distance make contact with the inner wall of the outer part 37 of the edge groove 33, as disclosed in FIG. 6c. According to an aspect the distance that the rod-shaped element could be moved is the difference between the first height H1 of the inner part 36 and the second height H2 of the outer part 37. In this position the flexible tongue 6 is positioned at the rod surface 42 of the rod-shaped element 31. The rod surface 42 restricts that the flexible tongue 6 is flexed outwards. According to an aspect the flexible tongue 6 flexes outward until it makes contact with the rod surface 42 of the rod-shaped element 31.

When the rod-shaped element 31 is moved upwards in the insertion groove 32 by the user and the flexible tongue 6 is not positioned in the recess 34, the dismantling-rod 40 is configured to be moved out of the edge groove 33. As the flexible tongue 6 is restricted from being flexed back into the recess 34 by the rod surface 42 in this position, the dismantling-rod 40 could be extracted from the outer part 37 without the mechanical locking device 30 returning to its locked position.

After the dismantling-rod 40 has been moved out of the edge groove 33 the rod-shaped element 31 is configured to be moved further outwards and out of the insertion groove 32 to dismantle the first panel 10 from the second panel 20. The first panel 10 is now dismantled from the second panel 20.

According to an aspect when the rod-shaped element 31 is moved outwards in the insertion groove 32, the flexible tongue 6 is flexed outwards towards the rod surface 42 of the rod-shaped element 31.

According to an aspect a method for dismantling the set 1 from a locked position to a dismantled position by inserting the dismantling-rod 40 into the outer part 37 of the edge groove 33 and move the flexible tongue 6 out of the recess 34 of the rod-shaped element 31 by flexing the flexible tongue 6 inwards in the edge groove 33, move the rod-shaped element 31 and the dismantling-rod 40 outwards in the insertion groove 32, retract the dismantling-rod 40 out of the edge groove 33, and retract the rod-shaped element 31 further outwards and out of the insertion groove 32 to dismantle the first panel 10 from the second panel 20.

According to an aspect the step of moving comprise moving the rod-shaped element 31 such a distance outwards that the flexible tongue 6 is unable to flex back into the recess 34.

After the first panel 10 has been dismantled from the second panel 20 the first panel 10 can be assembled once again to the second panel 20 or to another panel comprising corresponding features. After the first panel 10 has been dismantled from the second panel 20 the second panel 20 can be assembled once again to the second panel 10 or to another panel comprising corresponding features.

Figure 9:
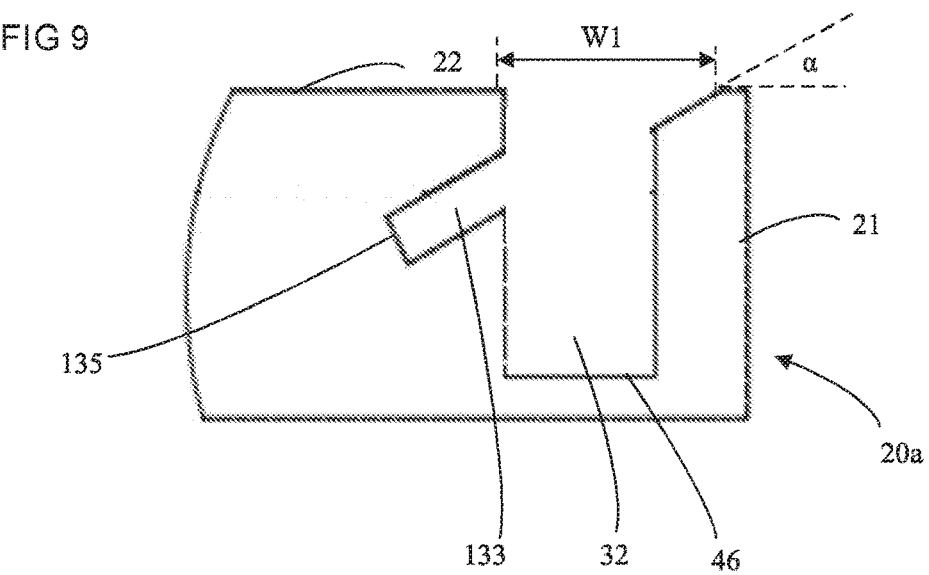
FIG. 9 shows a cross sectional view of a part of the second panel in FIGS. 7a, 7b according to an aspect of the invention.

According to an aspect, as disclosed in FIG. 9, 10, 11 the set 1 comprise a second panel 20a and the mechanical locking device 30 comprises a panel groove 133 at a second panel surface 22 of the second panel 20a. The panel groove 133 has the same function as the edge groove 33 disclosed above, however, according to this aspect the groove is positioned at the second panel surface 22 instead of at the second edge surface 21. The panel groove 133 extends at an angle α in the second panel 20a in view of the second panel surface 22. Put in another way, the panel groove 133 is made in the second panel 20a and is angled with an angle α in view of the second panel surface, as is disclosed in FIG. 9.

The flexible tongue 6, not disclosed in FIG. 9, is according to an aspect positioned in the panel groove 133. The rod-shaped element 31 is positioned at the first edge surface 11 as disclosed above. The insertion groove 32 is, according to this aspect, positioned at the second panel surface 22 and extends from the second panel surface 22 to the panel groove 133.

According to an aspect the rod-shaped element 31 is configured to be inserted into the insertion groove 32 and the rod-shaped element 31 comprises a recess 34.

According to an aspect the flexible tongue 6 is configured to cooperate with the recess 34 for a locking of the first panel 10 to the second panel 20a in a first direction which is perpendicular to the second panel surface 22.

According to an aspect the angle α is between 10°-80° degrees. According to an aspect the angle α is between 10°-70° degrees. According to an aspect the angle is between 20-70 degrees. According to an aspect the angle α is between 15°-50° degrees. According to an aspect the angle α is between 25°-35° degrees.

According to an aspect the second edge surface 21 of the second panel 20a is positioned at a distance from the panel groove 133.

According to an aspect a width W1 of the panel groove 133 in the second panel surface 22 is smaller than a width W2 of the first edge surface 11. Put in another way the first edge surface 11 of the first panel 10 covers the panel groove 133 when the first panel 10 is locked towards the second panel 20a.

Figure 10:
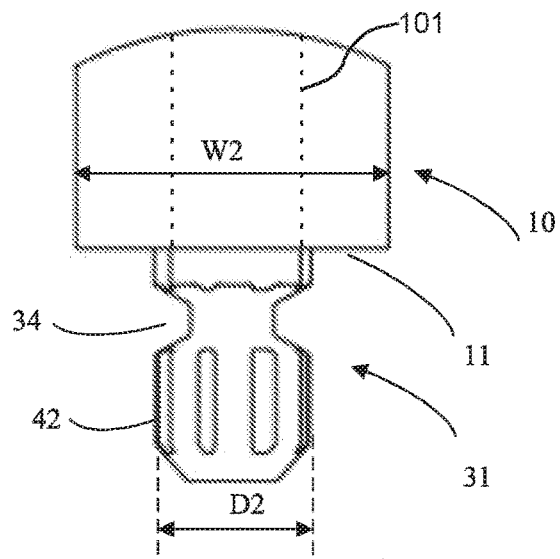
FIG. 10 shows a side view of a part of the first panel in FIGS. 8a, 8b and a rod-shaped element according to an aspect of the invention.
Figure 11:
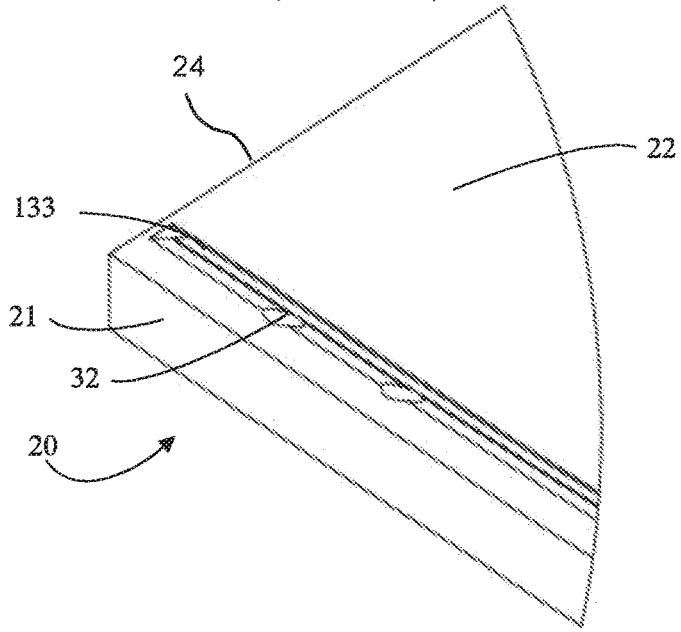
FIG. 11 shows a 3D view from above of a part of the first panel in FIGS. 7a, 7b according to an aspect of the invention.

According to an aspect the width W1 of the panel groove 133 in the second panel surface 22 is larger than a diameter D2, disclosed in FIG. 10, of the rod-shaped element 133.

According to an aspect the panel groove 133 is a bottom-ended groove, comprising a bottom surface 135 which is positioned at a distance from the insertion groove 32.

According to an aspect the flexible tongue 6 is arranged at the bottom surface 135 of the panel groove 133.

According to an aspect the flexible tongue 6 is configured to be flexed inwards towards the bottom surface 135 to be completely positioned in the panel groove 133.

According to an aspect the flexible tongue 6, in an unflexed state, is configured to be position partly in the panel groove 133 and partly in the insertion groove 32.

According to an aspect the panel groove 133 is a longitudinal groove 133 that extends in a longitudinal direction of the second planar surface 22.

According to an aspect the longitudinal direction of the longitudinal groove 133 is substantially parallel to the second edge surface 21.

According to an aspect the second panel 20a comprise a third edge surface 23 and that the panel groove 133 of the mechanical locking device 30 further is positioned at the third edge surface 23.

According to an aspect the second panel 20a comprise a fourth edge surface 24 and that the panel groove 133 of the mechanical locking device 30 further is positioned at the fourth edge surface 24.

According to an aspect the panel groove 133 extends from the third edge surface 23 to the fourth edge surface 24.

According to an aspect the insertion groove 32 is a bottom-ended groove, such as a bottom ended drill hole, comprising a bottom surface 46 which is positioned at a distance from the panel groove 133.

According to an aspect the first edge surface 11 comprises two or more of said rod-shaped element 31 and the second panel surface 22 comprises two or more of said insertion groove 32 and one or more panel groove 133, preferably arranged linearly, wherein each of the rod-shaped elements 31 is configured to be inserted into one of the insertion grooves 32.

According to an aspect, in the locked position between the first panel 10 and the second panel 20a, the panel groove 133 is configured to receive the dismantling-rod 40.

When the dismantling rod 40 is received in the panel groove 133, the rod-shaped element 31 is configured to cooperate with the dismantling-rod 40 for flexing the flexible tongue 6 inwards in the panel groove 133. Thereafter, when the flexible tongue 6 is flexed inwards in the panel groove 133, the rod-shaped element 31 and the dismantling-rod 40 is configured to be moveable outwards in the insertion groove 32 and out of the insertion groove 32 to dismantle the first panel 10 from the second panel 20a. As the panel groove 133 extend from the second panel surface 22 the dismantling could be made in less steps than the dismantling method described above. This is due to that the insertion groove 32 and the panel groove 133 is positioned at one and the same surface, the second panel surface 22.

According to an aspect the mechanical locking device 30 is configured to automatically lock the first panel 10 to the second panel 20a when the rod-shaped element 31 is inserted into the insertion groove 32 and the first edge surface 11 is arranged against the second panel surface 22.

According to an aspect the flexible tongue 6 is arranged between the recess 34 of the rod-shaped element 31 and the bottom surface 135 of the panel groove 133 in the locked position. According to an aspect the second edge surface 21 is essentially perpendicular to the second panel surface 22.

According to an aspect the rod-shaped element 31 according to the above could be connected to a second panel 20 comprising an edge groove 33 according to the above or to a panel groove 133 according to the above.

According to an aspect the second panel 20, 20a comprise one or more edge grooves 33 and one or more panel grooves 133. According to an aspect the second panel 20, 20a is connected and locked to two or more first panels 10.

The insertion groove 32 may be formed in the second panel surface 22 and in a core of the second panel 20.

The second panel surface 22 may comprise a decorative layer and the insertion groove may extend though the decorative layer.

The insertion groove may be formed by mechanical cutting, such as milling or sawing.

An edge element, such as an edge band, is according to an aspect attached to the second edge for covering the edge groove and for reinforcing the second edge 21. The edge element may be glued to the second edge or attached by a mechanical locking device, which may comprise a part that protrudes from the edge element and is configured to be inserted into the edge groove 53. The part may be attached to the edge groove by friction. The edge element is according to an aspect not covering the third and/or the fourth edge surface 23, 24 such that the dismantling-rod 40 could be inserted into the edge groove 33. The edge element is according to an aspect removable such that the dismantling-rod 40 could be inserted into the edge groove 33.

According to an aspect the second panel may comprise two or more of said edge groove 5.

According to an aspect the first panel 10 comprises two or more first edge surfaces 11 according to the above. Put in another way, one or more rod-shaped elements 31 can be positioned at two or more of the edges of the first panel 10, as disclosed in FIGS. 15 and 17.

According to an aspect one or more rod-shaped elements 31 at one first edge surface 11 of one first panel 10 is positioned off-set in view of one or more rod-shaped elements at another first edge surface 11 of the first panel 10. By positioning the rod-shaped elements 31 off-set at different first edge surfaces 11 of the first panel 10, unintended assembly of different first and second panels 10, 20, 20a could be avoided if the position of the rod-shaped elements 31 at first edge surface 11 only correspond to the position of the insertion grooves 32 at the second panel surface 22 to which it intended to be connected.

Figure 15:
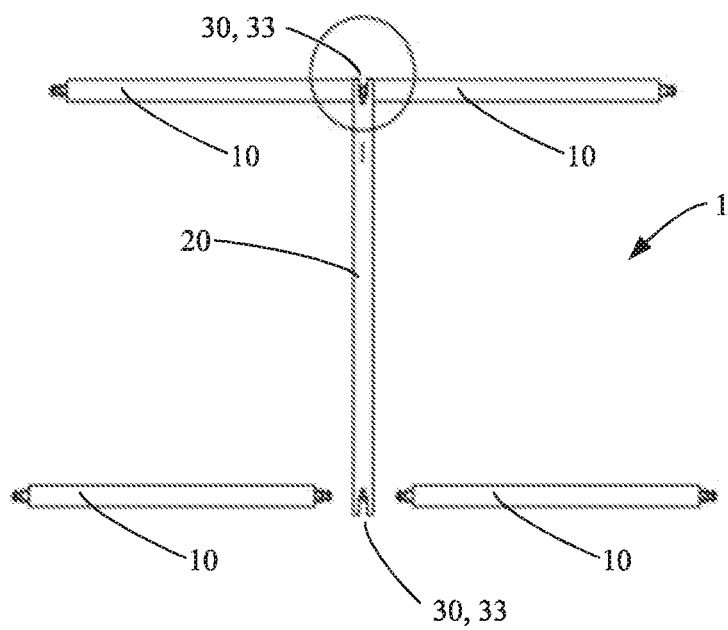
FIG. 15 shows a side view of a set in an assembled state and in an unassembled stat of an aspect of the invention.
Figure 16:
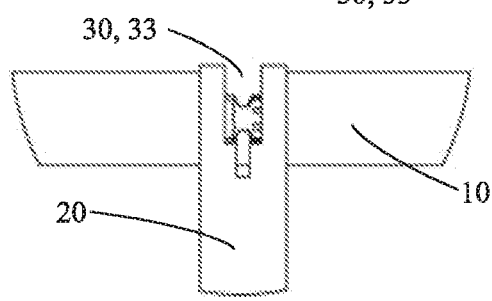
FIG. 16 shows a side view of an enlargement of a part of the set in FIG. 15.

According to an aspect one second panel could be connected to four first panels as disclosed in FIG. 15. According to an aspect the second panel 20 comprises two second panel surfaces 22 and that one or more insertion grooves 32 extend from one of the second panel surface 22 and one or more insertion grooves 32 extend from the other second panel surface 22 to a common edge groove 33, as disclosed in FIGS. 15 and 16.

Figure 17:
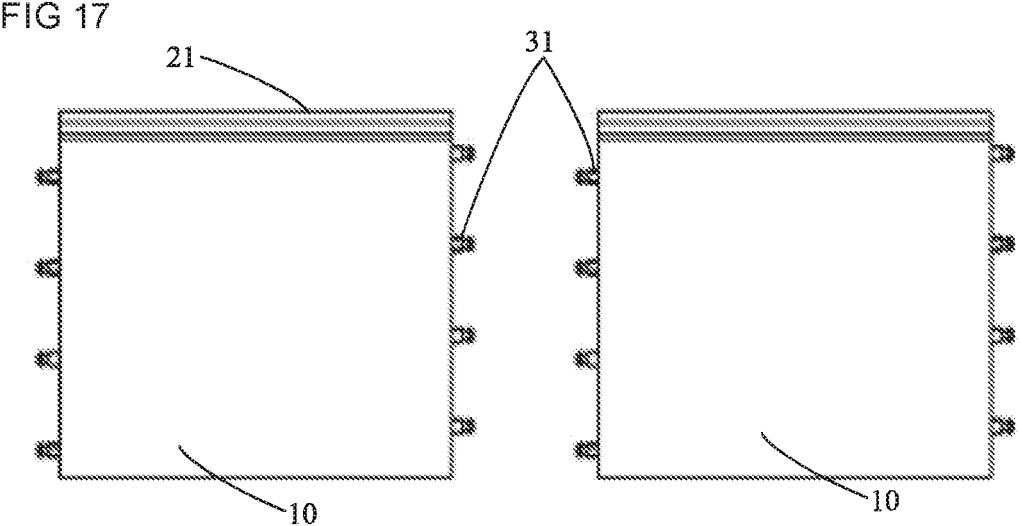
FIG. 17 shows a view from above of 2 of the second panels in FIG. 15.

According to an aspect a panel could be a combination of the first panel 10 and the second panel 20, 20a and comprise rod-shaped elements 31 at one edge and a panel groove 133 at a panel surface and/or an edge groove at another edge surface, as disclosed in FIG. 17.

The flexible tongue 6 may be according to the flexible tongue described and shown in FIGS. 2A-2F in WO2015/105449. FIGS. 2A-2F and the related disclosure from page 6, line 15 to page 7, line 2, in WO2015/105449 are hereby expressly incorporated by reference herein.

The core of the first panel 10 and/or of the second panel 20, 20a may be a wood-based core, preferably made of MDF, HDF, OSB, WPC, plywood or particleboard. The core may also be a plastic core comprising thermosetting plastic or thermoplastic e.g. vinyl, PVC, PU or PET. The plastic core may comprise fillers.

The first panel 10 and/or the second panel 20, 20a may also be of solid wood.

The first panel 10 and/or the second panel 20, 20a may be provided with a decorative layer, such as a foil or a veneer, on one or more surfaces.

According to an aspect the set 1 are one of a bottom piece of a drawer, a frame and a back piece of a furniture product.

According to an aspect the set of panels are resilient panels. The resilient panels may comprise a core comprising thermoplastic material. The thermoplastic material may be foamed.

The thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be formed of several layers.

The aspects described above may comprise a decorative layer, such as a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative foil is preferably printed, for example by direct printing, rotogravure, or digital printing. According to an aspect the decorative layer comprise melamine, a high pressure laminate (HPL) or a veneer.

The aspects described above may comprise a wear layer such as a film or foil. The wear layer may comprise thermoplastic material. The thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The aspects described above may comprise a wood base core, such as HDF, MDF, plywood, particleboard, OSB or Masonite.

The different aspects, embodiments and alternatives described above could be combined with one or more of the other described aspects, embodiments and alternatives.

The invention claimed is:

1. A set comprising a first panel, a second panel and a mechanical locking device for locking the first panel to the second panel, wherein
   the first panel comprises a first edge surface and a first panel surface,
   the second panel comprises a second panel surface,
   the first edge surface is facing the second panel surface in a locked position of the first and the second panel,
   the mechanical locking device comprises an panel groove at the second panel surface, a flexible tongue positioned in the panel groove, a rod-shaped element at the first edge surface and an insertion groove at the second panel surface extending from the second panel surface to the panel groove,
   the rod-shaped element is configured to be inserted into the insertion groove and the rod-shaped element comprises a recess,
   the flexible tongue is configured to cooperate with the recess for a locking of the first panel to the second panel in a first direction which is perpendicular to the second panel surface, and
   the panel groove extending at an angle α in the second panel in view of the second panel surface.

2. The set as claimed in claim 1, wherein the angle α is between 10-80 degrees.

3. The set as claimed in claim 1, wherein the angle α is between 10-70 degrees.

4. The set as claimed in claim 1, wherein the second panel comprises a second edge surface at a distance from the panel groove.

5. The set as claimed in claim 1, wherein a width of the panel groove in the second panel surface is smaller than a width of the first edge surface.

6. The set as claimed in claim 1, wherein a width of the panel groove in the second panel surface is larger than a diameter of the rod-shaped element.

7. The set as claimed in claim 1, wherein the panel groove is a bottom-ended groove, comprising a bottom surface which is positioned at a distance from the insertion groove.

8. The set as claimed in claim 7, wherein the flexible tongue is arranged at the bottom surface of the panel groove.

9. The set as claimed in claim 1, wherein the flexible tongue is configured to be flexed inwards towards the bottom surface to be completely positioned in the panel groove.

10. The set as claimed in claim 1, wherein the flexible tongue, in an unflexed state, is configured to be position partly in the panel groove and partly in the insertion groove.

11. The set as claimed in claim 1, wherein the panel groove is a longitudinal groove that extends in a longitudinal direction of the second planar surface.

12. The set as claimed in claim 11, wherein the longitudinal direction of the longitudinal groove is substantially parallel to the second edge surface.

13. The set as claimed in claim 1, wherein the second panel comprises a third edge surface, and the panel groove of the mechanical locking device further is positioned at the third edge surface.

14. The set as claimed in claim 1, wherein the second panel comprises a fourth edge surface, and the panel groove of the mechanical locking device further is positioned at the fourth edge surface.

15. The set as claimed in claim 14, wherein the panel groove extends from the third edge surface to the fourth edge surface.

16. The set as claimed in claim 15, wherein the flexible tongue is arranged between the recess and the bottom surface of the panel groove in the locked position.

17. The set as claimed in claim 1, wherein the insertion groove is a bottom-ended groove, comprising a bottom surface which is positioned at a distance from the panel groove.

18. The set as claimed in claim 1, wherein the first edge surface comprises two or more of said rod-shaped element and the second panel surface comprises two or more of said insertion groove, wherein each of the rod-shaped elements is configured to be inserted into one of the insertion grooves.

19. The set as claimed in claim 1, wherein, in the locked position, the panel groove is configured to receive a dismantling-rod,
   wherein, when the dismantling rod is received in the panel groove, the rod-shaped element is configured to cooperate with the dismantling-rod for flexing the flexible tongue inwards in the panel groove,
   wherein, when the flexible tongue is flexed inwards in the panel groove, the rod-shaped element and the dismantling-rod is configured to be moveable outwards in the insertion groove and out of the insertion groove to dismantle the first panel from the second panel.

20. The set as claimed in claim 1, wherein the mechanical locking device is configured to automatically lock the first panel to the second panel when the rod-shaped element is inserted into the insertion groove and the first edge surface is arranged against the second panel surface.

21. The set as claimed in claim 1, wherein the rod-shaped element is configured to be attached in an attachment groove in the first edge surface.

22. The set as claimed in claim 1, wherein the second edge surface is essentially perpendicular to the second panel surface.

23. The set as claimed in claim 1, wherein the recess extends along an entire circumference of the rod-shaped element.

24. Method for dismantling, from a locked position to a dismantled position, a set comprising a first panel, a second panel and a mechanical locking device for locking the first panel to the second panel, wherein:

the first panel comprises a first edge surface and a first panel surface, the second panel comprises a second panel surface, the first edge surface is facing the second panel surface in a locked position of the first and the second panel, the mechanical locking device comprises an panel groove at the second panel surface, a flexible tongue positioned in the panel groove, a rod-shaped element at the first edge surface and an insertion groove at the second panel surface extending from the second panel surface to the panel groove, the rod-shaped element is configured to be inserted into the insertion groove and the rod-shaped element comprises a recess, the flexible tongue is configured to cooperate with the recess for a locking of the first panel to the second panel in a first direction which is perpendicular to the second panel surface, and the panel groove extending at an angle $\alpha$ in the second panel in view of the second panel surface, wherein the method comprises:

inserting a dismantling-rod into the edge groove and move the flexible tongue out of the recess of the rod-shaped element by flexing the flexible tongue inwards in the edge groove, and moving the rod-shaped element and the dismantling-rod outwards in the insertion groove and out of the insertion groove to dismantle the first panel from the second panel.

\* \* \* \* \*